(12) United States Patent
Ettes et al.

(10) Patent No.: US 10,523,052 B2
(45) Date of Patent: Dec. 31, 2019

(54) WIRELESS INDUCTIVE POWER TRANSFER

(71) Applicant: KONINKLIJKE PHILIPS N.V., Eindhoven (NL)

(72) Inventors: Wilhelmus Gerardus Maria Ettes, Leeuwarden (NL); Antonius Adriaan Maria Staring, Eindhoven (NL); Klaas Jacob Lulofs, Eindhoven (NL); Eddy Gerrit Veltman, Steenbergen (NL)

(73) Assignee: Koninklijke Philips N.V., Eindhoven (NL)

( * ) Notice: Subject to any disclaimer, the term of this patent is extended or adjusted under 35 U.S.C. 154(b) by 267 days.

(21) Appl. No.: 15/503,157

(22) PCT Filed: Sep. 14, 2015

(86) PCT No.: PCT/EP2015/070925
§ 371 (c)(1),
(2) Date: Feb. 10, 2017

(87) PCT Pub. No.: WO2016/041889
PCT Pub. Date: Mar. 24, 2016

(65) Prior Publication Data
US 2017/0229911 A1    Aug. 10, 2017

(30) Foreign Application Priority Data

Sep. 16, 2014  (EP) .................................... 14184964

(51) Int. Cl.
*H02J 50/10*     (2016.01)
*H02J 5/00*      (2016.01)
(Continued)

(52) U.S. Cl.
CPC .............. *H02J 50/10* (2016.02); *H02J 5/005* (2013.01); *H02J 50/12* (2016.02); *H02J 7/025* (2013.01); *H02J 17/00* (2013.01)

(58) Field of Classification Search
None
See application file for complete search history.

(56) References Cited

U.S. PATENT DOCUMENTS

| | | | |
|---|---|---|---|
| 3,629,743 | A | 12/1971 | Berney |
| 5,350,413 | A | 9/1994 | Miller |

(Continued)

FOREIGN PATENT DOCUMENTS

| | | |
|---|---|---|
| DE | 102011016027 A1 | 10/2012 |
| WO | 2013024396 A1 | 2/2013 |

OTHER PUBLICATIONS

Wireless Power Consortium, Downloaded From http://www.wirelesspowerconsortium.com/index.html on March 18, 2014, 2 Pages.

(Continued)

*Primary Examiner* — Jared Fureman
*Assistant Examiner* — James P Evans

(57) ABSTRACT

A wireless power transfer system includes a power receiver and a power transmitter providing power using an inductive power signal. The power transmitter includes a resonance circuit having capacitive and inductive impedances, and a driver configured to generate a drive signal for the resonance circuit. A frequency modification circuit is configured to control the resonance frequency of the resonance circuit by slowing a state change for the capacitive and/or inductive impedance for a fractional time interval of at least some cycles of the drive signal, The frequency modification circuit is configured to align at least one of a start time and an end time for the fractional time interval to transitions of a timing signal. In the power transmitter, the driver is configured to generate the timing signal to have transitions synchronized to the drive signal. The slowing may be by impeding current flow between the capacitive and inductive impedances.

15 Claims, 21 Drawing Sheets

(51) Int. Cl.
*H02J 50/12* (2016.01)
*H02J 7/02* (2016.01)
*H02J 17/00* (2006.01)

(56) References Cited

U.S. PATENT DOCUMENTS

| | | |
|---|---|---|
| 2003/0006880 A1 | 1/2003 | Zimmer |
| 2004/0085145 A1 | 5/2004 | Dinn et al. |
| 2006/0113970 A1 | 6/2006 | Stover et al. |
| 2011/0101790 A1 | 5/2011 | Budgett |
| 2012/0319479 A1* | 12/2012 | Covic ............... H02J 50/40 307/31 |
| 2013/0033118 A1* | 2/2013 | Karalis ............. H01F 38/14 307/104 |
| 2014/0191818 A1* | 7/2014 | Waffenschmidt ....... H02J 7/025 333/17.1 |
| 2014/0225439 A1* | 8/2014 | Mao ................ H02M 3/3376 307/31 |
| 2016/0380483 A1 | 12/2016 | Rehm |

OTHER PUBLICATIONS

QI System Description Wireless Power Transfer, vol. I: Low Power; Part 1: Interface Definition, Version 1.0, Jul. 2010, 84 Pages.

\* cited by examiner

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2015/070925, filed on Sep. 14, 2015, which claims the benefit of European Patent Application No. 14184964.6, filed on Sep. 16, 2014. These applications are hereby incorporated by reference herein.

FIELD OF THE INVENTION

The invention relates to inductive power transfer and in particular, but not exclusively, to a power transmitter providing inductive power transfer using elements compatible with the Qi Specifications.

BACKGROUND OF THE INVENTION

The number and variety of portable and mobile devices in use have exploded in the last decade. For example, the use of mobile phones, tablets, media players etc. has become ubiquitous. Such devices are generally powered by internal batteries, and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

Many wireless power transmission systems, such as e.g. Qi, supports communication from the power receiver to the power transmitter thereby enabling the power receiver to provide information that may allow the power transmitter to adapt to the specific power receiver.

In many systems, such communication is by load modulation of the power transfer signal. Specifically, the communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage.

More information of the application of load modulation in Qi can e.g. be found in chapter 6 of part 1 of the Qi wireless power specification (version 1.0).

It has been found that performance of a power transfer system is dependent on how well the power transmitter and power receiver match each other. For example, in many scenarios, the power transmitter comprises a resonance circuit for generating the power transfer signal and the power receiver comprises a resonance circuit for receiving the power transfer signal. In such systems, it is often advantageous for the resonance frequencies to be matched, and in many scenarios, such a matching is desired in order for the system to operate in what is known as resonant mode. Matching of the resonance frequencies to operate in the resonant mode may often maximize power transfer efficiency.

However, due to e.g. component variations, design variations, environmental changes etc., it is not feasible to generate power transmitters and power receivers with very accurately defined resonance frequencies. Rather, the variation in resonance frequencies may be as much as around 10% of the nominal value in many systems. Therefore, it cannot be guaranteed that a given power receiver and power transmitter will have matching resonance frequencies. In order to improve the matching in such systems, it has been proposed to include resonance circuits having variable resonance frequencies.

For example, WO 2013024396 A1 discloses a specific approach for making the resonance circuit of a power receiver adaptable such that it can adapt its resonance circuit 201 to match that of the received power transfer signal. However, although the approach may improve operation in many scenarios, it is not optimal in all circumstances. For example, in many scenarios, it is not practical to adapt the power receivers. Indeed in many systems there may be a large number of deployed legacy power receivers and it may be desired that new power transmitters can also optimize performance for such receivers. Furthermore, the adaptation of the resonance frequency to a received power transfer signal, such as in particular the approach of WO 2013024396 A1, is complex and often requires careful and accurate measurements of potentially weak signals. For example, the system of WO 2013024396 A1 is based on measurements of a capacitor current for a resonating capacitor of the power receiver resonance circuit. However, such measurements are difficult, require dedicated measurement circuits, and may disturb the resonance behavior.

An improved power transfer approach would accordingly be advantageous. In particular, an approach that allows improved operation, improved power transfer, increased flexibility, facilitated implementation, facilitated operation, improved communication, reduced communication errors, improved power control, improved power transfer, reduced measurement needs, increased support for a variety of power receivers and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power signal; the power transmitter comprising: a resonance circuit for generating the inductive power signal, the resonance circuit comprising a capacitive impedance and an inductive impedance; a driver for generating a drive signal for the resonance circuit, the drive signal having an operating frequency and being arranged to generate the timing signal to have transitions synchronized to the drive signal; and a frequency modification circuit for controlling a resonance frequency of the resonance circuit by slowing a state change for at least one of the capacitive impedance and the inductive impedance for a fractional time interval of each of at least a plurality of cycles of the drive signal, the frequency modification circuit being arranged to align at least one of a start time and an end time for the fractional time interval to at least some transitions of the timing signal.

The invention may provide improved performance in many wireless power transfer systems. It may provide facilitated and/or improved adaptation of a power transmitter to provide a matching of the power transmitter to different power receivers. The approach may allow power transmitters to adapt to power receivers, thereby e.g. allowing power transmitters to be used with a range of power receivers.

The approach may in many scenarios provide improved power transfer operation, and in particular may provide improved power efficiency. In many scenarios, the approach may provide improved load modulation. Indeed, in many embodiments, improved power transfer, and especially improved power transfer efficiency, can be achieved while still providing reliable communication based on load modulation of the power signal.

The approach may provide reduced complexity and/or facilitated operation and/or implementation in many scenarios. Specifically, the power transmitter can control the frequency modification circuit based on the drive signal and an adaptation of the drive signal may automatically result in the adaptation of the resonance frequency. In many embodiments, the alignment may be such that the operating frequency and the resonance frequency are intrinsically linked together, and specifically they may be linked such that they are continuously the same. The alignment to the drive signal may specifically obviate or reduce the need for measurements of signals such as currents or voltages of the resonance circuit.

The approach may for example improve load modulation communication. The Inventors have specifically realized that intermodulation distortion can degrade load modulation communication but can be effectively mitigated by controlling and linking the resonance frequency of a power transmitter and the operating frequency of the drive signal. The invention may e.g. provide reduced intermodulation distortion by linking the drive signal and the resonance frequency via the synchronization/alignment of the fractional time intervals to the drive signal thereby allowing the operating frequency and the resonance frequency to be locked together.

The slowing of the state change may be a slowing relative to a resonance circuit including only the capacitive impedance and the inductive impedance. The capacitive impedance and the inductive impedance may typically be coupled in a series or parallel resonance configuration. The state may specifically be an energy state, and specifically may be a voltage across the capacitive impedance and/or a current through the inductive impedance.

The fractional time interval has a duration which is less than a time period of the drive signal, and typically a duration which is less than half a time period of the drive signal. The start time and end times may typically be time instants relative to a time instant/event of each cycle (in which a fractional time interval is present). For example, the start time and end time may be considered relative to a zero crossing of the drive signal.

The fractional time interval may specifically be a time interval occurring in a plurality of (but not necessarily all or consecutive) cycles of the drive signal and having a duration of less than a cycle/time period of a cycle of the drive signal.

The capacitive impedance may typically be a capacitor and the inductive impedance may typically be an inductor. However, in some embodiments, the capacitive impedance and/or the inductive impedance may e.g. also include a resistive component.

The resonance frequency may typically be reduced the longer the duration of the fractional time interval. The frequency modification circuit may reduce a natural resonance frequency of the capacitive impedance and the inductive impedance (corresponding to a frequency at which they would oscillate in a resonance circuit consisting of only the capacitive impedance and the inductive impedance). The effective resonance frequency may in many embodiments be changed by the power transmitter increasing the duration of the fractional time interval, e.g. by changing the start time and/or end time for the fractional time interval.

In some embodiments, the power transmitter may be arranged to reduce the resonance frequency by increasing the duration of the fractional time interval.

The timing signal may in addition to the transitions which the fractional time interval timing is aligned to comprise other transitions. Such other transitions may in many scenarios be ignored by the frequency modification circuit (for example, the frequency modification circuit may only align to positive edge transitions and ignore negative ones or vice versa). The transitions of the timing signal may be any change of the value or property of the timing signal which can be detected and for which the timing can be determined. In many embodiments, the timing signal may be arranged to transition between two values and the transitions may be transitions between these two values, or e.g. may only be transitions in one direction.

A transition may be a change in the signal of the timing signal, and specifically a change from one state to another (the states may be instantaneous, i.e. may be snapshots or instantaneous values of a (continuously) changing parameter). In many embodiments, a transition may be a change in a signal level of the timing signal, and specifically a change from one signal level to another signal level (the signal levels before and after the change may be instantaneous, i.e. may be snapshots or instantaneous values of a (continuously) changing signal level).

The power signal may not be the main power transfer signal for providing high power transfer to the power receiver. In some scenarios, it may primarily be used as a communication carrier for the load modulation, and may e.g. only provide power to elements of the power receiver itself, or even to only the load used for load modulation.

The power receiver may provide power to an external load, such as for charging a battery or powering a device.

Alignment of the begin or end times of the fractional time intervals with transitions of the timing signal may in many scenarios correspond to the begin or end times substantially coinciding with the transitions, e.g. within $\frac{1}{50}^{th}$ of a cycle time.

In accordance with an optional feature of the invention, the driver is arranged to generate the timing signal to have transitions with a fixed time offset to a time instant of at least one of a zero crossing, a maximum and a minimum of cycles of the drive signal; and the frequency modification circuit is arranged determine the at least one of the start time and the end time for the fractional time interval to have a fixed time offset to the at least some transitions of the timing signal.

In each of the at least a plurality of cycles of the drive signal, the timing of the end and/or start time may be time aligned and time synchronized to a zero crossing or extreme of the generated drive signal.

The fixed offsets are applied in each of the at least a plurality of cycles of the drive signal.

In many embodiments, at least one of the start and end time of the fractional time interval has a fixed time offset to a time instant of the plurality of cycles of the drive signal. The time instant may be the time of an event, such as a zero crossing.

The approach allows for an inherent and automatic locking of the drive signal operating frequency and the effective resonance of the resonance circuit. This may be achieved by locking at least one of the start and end times of the fractional time interval to a time instant of the drive signal cycles. The approach may in many embodiments allow a direct cycle by cycle adaptation of the frequencies (and may specifically allow each time period of effective resonance frequency to match the time period of the corresponding cycle of the drive signal).

In some embodiments, the start time of a fractional time interval may be generated to have a fixed time offset to the drive signal crossing a threshold (such as a zero crossing) and the end time of the fractional time interval may be generated to have a fixed time offset to a switch time of a switch of a switch circuit generating the drive signal.

In some embodiments, the end time of a fractional time interval may be generated to have a fixed time offset to the drive signal crossing a threshold (such as a zero crossing) and the start time of the fractional time interval may be generated to have a fixed time offset to a switch time of a switch of a switch circuit generating the drive signal.

In some embodiments, the frequency modification circuit is arranged to slow the state change by impeding an energy flow between the inductive impedance and the capacitive impedance during the fractional time interval.

This may provide improved performance in many scenarios, and may in particular provide an effective adjustment of the resonance frequency. The approach may facilitate implementation. The energy flow may be impeded while being from the capacitive impedance to the inductive impedance, from the inductive impedance to the capacitive impedance, or both when it is from the inductive impedance to the capacitive impedance and when it is from the capacitive impedance to the inductive impedance.

Impeding energy flow may include both reducing energy flow and completely preventing any energy flow.

In many embodiments, the frequency modification circuit is arranged to slow the state change by impeding current flow between the inductive resonance and the capacitive impedance during the fractional time interval.

This may provide a particularly effective control and may provide a practical implementation. The current flow may be a positive or negative current flow. Impeding current flow may include both reducing current flow and completely preventing any current flow.

In accordance with an optional feature of the invention, the driver comprises a switching bridge for generating the drive signal; and wherein the driver is arranged to synchronize the transitions of the timing signal to transitions of a switch signal for a switch of the switching bridge.

This may provide improved performance in many scenarios, and may in particular allow a very efficient and practical implementation. A low complexity but accurate control can be achieved in many embodiments.

In some embodiments, the power transmitter is arranged to determine the at least one of the start time and the end time for the fractional time interval to have a fixed time offset to a switch time instant for a switch circuit generating the drive signal.

Specifically, transitions may be generated to have a first a fixed time offset to a switch time instant for a switch circuit (such as a switching bridge) generating the drive signal, and the frequency modification circuit may set the start and/or end time of the time interval to have a second fixed time offset to the transitions.

The fixed offsets are applied in each of the at least a plurality of cycles of the drive signal.

In accordance with an optional feature of the invention, the frequency modification circuit comprises a switch and rectifier and the frequency modification circuit is arranged to align one of the start time and the end time to the transitions and to align the other of the start time and the end time to the rectifier switching between a non-conductive and a conductive state.

This may provide a particularly low complexity and effective control. In particular, it may in many scenarios allow automated adaptation to the appropriate times for slowing the state changes, such as specifically to appropriate zero crossings.

The alignment of the start and end times in response to different parameters may provide additional flexibility, and in particular may allow more flexibility of controlling parameters of the drive signal, such as specifically the duty cycle.

In accordance with an optional feature of the invention, the frequency modification circuit is arranged to slow the state change for the capacitive impedance by diverting current from the inductive impedance away from the capacitive impedance during the fractional time intervals.

This may provide a particularly effective performance while allowing facilitated and typically low complexity implementation.

In accordance with an optional feature of the invention, the frequency modification circuit comprises a current diversion path arranged to divert current from the inductive resonance away from the capacitive impedance, the current diversion path comprising a switch for connecting and disconnecting the current diversion path; and the frequency modification circuit being arranged to align switching of the switch to the timing signal.

This may provide a particularly effective performance while allowing facilitated and typically low complexity implementation.

In accordance with an optional feature of the invention, the frequency modification circuit comprises a switch and rectifier coupled in a series configuration and the frequency modification circuit is arranged to align one of the start time and the end time to the transitions and to synchronize the other of the start time and the end time to the rectifier switching between a non-conductive and a conductive state.

This may provide a particularly low complexity and effective control. In particular, it may in many scenarios allow automated adaptation to the appropriate times for slowing the state changes, such as specifically to appropriate zero crossings.

The alignment of the start and end times in response to different parameters provide additional flexibility and in particular may allow more flexibility of controlling parameters of the drive signal, such as specifically the duty cycle.

In many embodiments, the start time of the fractional time intervals may be aligned to the rectifier switching from a non-conductive to a conductive state, and the end times are controlled by the timing signal.

In accordance with an optional feature of the invention, a first end of the current diversion path is coupled to a junction point between the inductive impedance and the capacitive impedance.

This may provide a particularly advantageous implementation which allows effective yet facilitated operation. In many embodiments, the approach may reduce the complexity of the frequency modification circuit, such as specifically the number of dedicated components required.

In accordance with an optional feature of the invention, a second end of the current diversion path is coupled to a voltage supply rail.

This may provide a particularly advantageous implementation which allows effective yet facilitated operation. In many embodiments, the approach may reduce the complexity of the frequency modification circuit, such as specifically the number of dedicated components required. In many embodiments, it may facilitate the driving of the switch for connecting and disconnecting the current diversion path.

In accordance with an optional feature of the invention, the driver comprises a switching bridge generating the drive signal; and the driver is arranged to synchronize the transitions of the timing signal to coincide with transitions of a switch signal for a switch of the switching bridge.

This may provide improved performance and/or simplified implementation. The synchronization may specifically time align the transitions of the timing signal to those of the switch signal, say e.g. within $\frac{1}{50}^{th}$ of period time for the drive signal.

In accordance with an optional feature of the invention, the current diversion path comprises a switch and rectifier coupled in a series configuration, a first end of the current diversion path is coupled to a junction point between the inductive impedance and the capacitive impedance and a second end of the current diversion path is coupled to a ground supply rail for the switching bridge, and the power transmitter is arranged to align start times of the fractional time interval to a time of the rectifier switching from a non-conductive to a conductive state and to align end times of the fractional time interval to a switching of a switch of the switching bridge.

This may provide particularly advantageous performance and/or implementation.

In accordance with an optional feature of the invention, the frequency modification circuit is arranged to slow the state change for the inductive impedance by impeding current flow from the capacitive impedance to the inductive impedance during the fractional time interval.

This may provide a particularly effective performance while allowing facilitated and typically low complexity implementation.

In accordance with an optional feature of the invention, the frequency modification circuit is arranged to slow the state change for the inductive impedance by blocking current flow from the capacitive impedance to the inductive impedance during the fractional time interval.

This may provide a particularly effective performance while allowing facilitated and typically low complexity implementation.

According to another aspect of the invention there is provided method of operation for a power transmitter for wirelessly providing power to a power receiver using an inductive power signal, the power transmitter comprising a resonance circuit for generating the inductive power signal, the resonance circuit comprising a capacitive impedance and an inductive impedance; the method comprising: a driver generating a drive signal for the resonance circuit, the drive signal having an operating frequency; a frequency modification circuit controlling a resonance frequency for the resonance circuit by slowing a state change for at least one of the capacitive impedance and the inductive impedance for a fractional time interval of at least some cycles of the drive signal, the controlling of the resonance frequency including aligning at least one of a start time and an end time for the fractional time interval to transitions of a timing signal; and the driver further generating the timing signal to have transitions synchronized to the drive signal.

According to another aspect of the invention there is provided a wireless power transfer system comprising a power receiver and a power transmitter arranged to wirelessly provide power to the power receiver using an inductive power signal; the power transmitter comprising: a resonance circuit for generating the inductive power signal, the resonance circuit comprising a capacitive impedance and an inductive impedance; a driver generating a drive signal for the resonance circuit, the drive signal having an operating frequency, and generating the timing signal to have transitions synchronized to the drive signal; a frequency modification circuit controlling a resonance frequency for the resonance circuit by slowing a state change for at least one of the capacitive impedance and the inductive impedance for a fractional time interval of each of at least a plurality cycles of the drive signal, the controlling of the resonance frequency including aligning at least one of a start time and an end time for the fractional time interval to at least some transitions of the timing signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
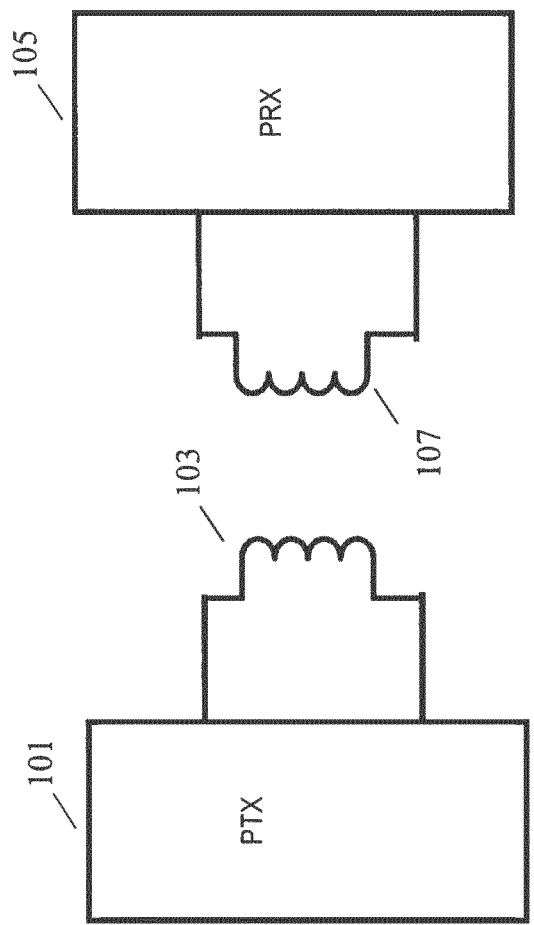
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a first power receiver 105 which includes (or is coupled to) a receiver coil/inductor 107.

The system provides a wireless inductive power transfer from the power transmitter 101 to the first receiver 105. Specifically, the power transmitter 101 generates a wireless inductive power signal (also referred to as a power signal, power transfer signal or an inductive power signal), which is propagated as a magnetic flux by the transmitter coil 103. The power signal may typically have a frequency between around 100 kHz to around 200 kHz. The transmitter coil 103 and the receiver coil 107 are loosely coupled and thus the receiver coil 107 picks up (at least part of) the power signal from the power transmitter 101. Thus, the power is transferred from the power transmitter 101 to the power receiver 105 via a wireless inductive coupling from the transmitter coil 103 to the receiver coil 107. The term power signal is mainly used to refer to the inductive signal/magnetic field between the transmitter coil 103 and the receiver coil 107 (the magnetic flux signal), but it will be appreciated that by equivalence it may also be considered and used as a reference to an electrical signal provided to the transmitter coil 103 or picked up by the receiver coil 107.

Figure 2:
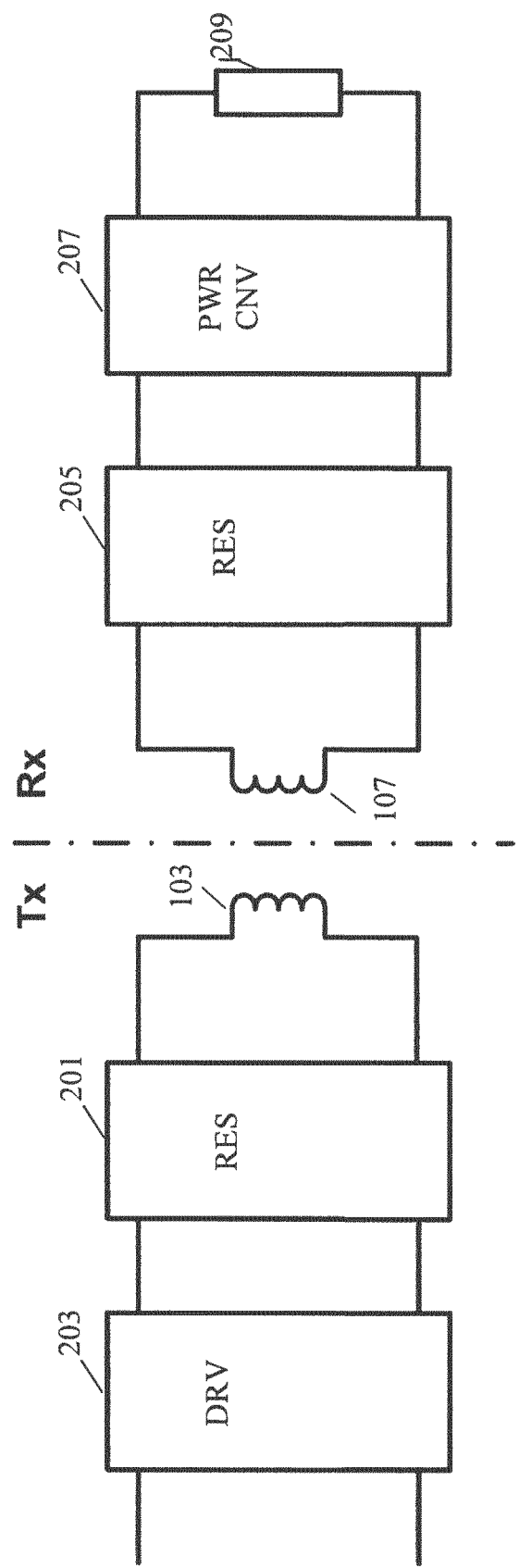
FIG. 2 illustrates an example of elements of a power transfer system in accordance with some embodiments of the invention.

FIG. 2 illustrates the system architecture of a specific example of the system of FIG. 1 in a bit more detail. In this example, the output circuit of the power transmitter 101 includes a resonance tank or resonance circuit 201 which includes the transmitter inductor 103 (in FIG. 2, the transmitter inductor 103 is for clarity shown external to the resonance circuit 201 but is considered to be part of this). The resonance circuit 201 of the power transmitter 101 will also be referred to as the primary resonance circuit 201. The resonance circuit 201 may typically be a serial or parallel resonance circuit, and may in particular consist of a resonance capacitor coupled in parallel (or in series) to the transmitter inductor 103. The power signal is generated by driving the output resonance circuit from a driver 203 generating a drive signal with a suitable operating frequency (typically in the 20-200 kHz frequency range).

Similarly, the input circuit of the power receiver 105 includes a resonance circuit or resonance tank 205 which includes the receiver inductor 107 (in FIG. 2, the receiver inductor 107 is for clarity shown external to the resonance circuit 205 but is considered to be part of this). The resonance circuit 205 of the power receiver 105 will also be referred to as the secondary resonance circuit 205. The secondary resonance circuit 205 may typically be a serial or parallel resonance circuit, and may in particular consist of a resonance capacitor coupled in parallel (or series) to the receiver inductor 107. The secondary resonance circuit 205 is coupled to a power converter 207 which converts the received power transfer signal, i.e. the induced signal provided by the secondary resonance circuit 205, into a power that is provided to an external load 209 (typically by performing AC/DC conversion as will be well known to the skilled person). Typically, the two resonance circuits 201, 205 have resonance frequencies close to each other in order to achieve sufficient signal amplitude at the power receiver 105.

The load may for example be a battery and the power provision may be in order to charge the battery. Thus in some embodiments, the following description may apply to a scenario which implements a method of wirelessly charging a battery. As another example, the load may be a device and the power provision may be in order to power the device. Thus in some embodiments, the following description may apply to a scenario which implements a method of wirelessly powering a device.

In the system, the resonance circuit 201 of the primary resonance circuit 201 is not a fixed resonance circuit but rather is a variable resonance circuit that has a resonance frequency which is a variable resonance frequency. Thus, the effective resonance frequency of the resonance circuit 201 may be changed e.g. by changing component characteristics of an inductor and/or capacitor of the resonance circuit 201.

The system of FIG. 2 accordingly employs a tunable/adaptable/variable resonance circuit in order to provide additional functionality and/or improved operation. Specifically, the use of a variable resonance circuit 201 may allow the resonance frequency of the resonance circuit 201 to be adapted to correspond to the resonance frequency of the secondary resonance circuit 205. Such an adaptation may provide improved power transfer and specifically may provide improved power efficiency.

For example, the resonance frequency of the primary resonance circuit 201, henceforth referred to as the primary resonance frequency, may be set to be sufficiently similar to the resonance frequency of the secondary resonance circuit 205, henceforth referred to as the secondary resonance frequency, to allow the coupling to operate in the so called resonant regime.

When operating in this mode, the system can operate at low coupling factors, and with an acceptable efficiency. The power transmitter can achieve this efficiency by operating at a frequency that is close to its resonance frequency where the internal losses are lowest. The low coupling factors enable a much greater positioning tolerance, or a much larger design freedom with respect to the shape and size of the hand-held device. As such, operation in the resonant regime is attractive.

In many embodiments, a particularly advantageous approach may be used for adapting the effective resonance frequency of the resonance circuit 201. In the approach, the dynamic changes for one of the components of the resonance circuit 201 are temporarily slowed (including potentially being completely stopped) for a fraction of the cycle. The approach will be described in more detail later.

The driver 203 of FIG. 2 generates a varying (and typically AC) voltage drive signal which is applied to the resonance capacitor (not shown in FIG. 2) and transmitter coil 103. In other embodiments, the primary resonance circuit 201 may be a series resonance circuit, and the voltage drive signal may be applied across the capacitor and inductor. In some embodiments, the driver 203 may be coupled directly (or indirectly) to the transmit coil 103 and the voltage drive signal may be provided to the transmit coil 103.

Thus, in the system, the driver 203 generates a drive signal which is fed to the primary resonance circuit 201/transmit coil 103, causing the transmit coil 103 to generate the power signal providing power to the power receiver 105.

Figure 3:
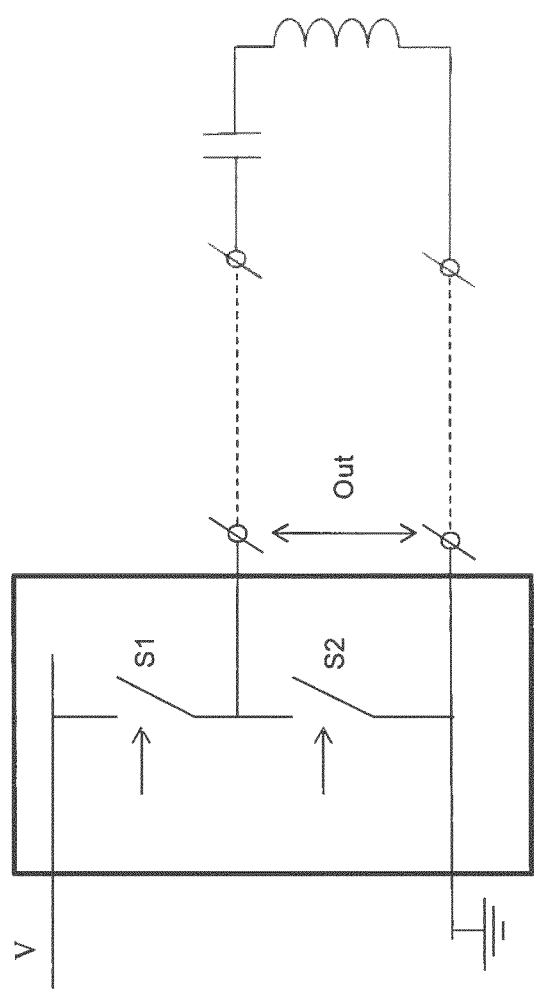
FIG. 3 illustrates an example of elements of a half-bridge inverter for a power transmitter in accordance with some embodiments of the invention.
Figure 4:
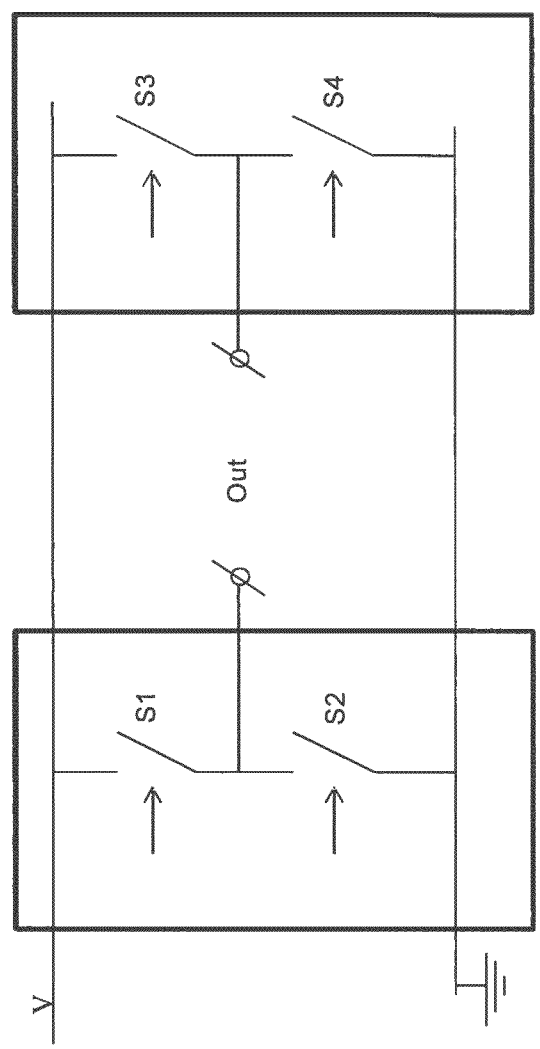
FIG. 4 illustrates an example of elements of a full-bridge inverter for a power transmitter in accordance with some embodiments of the invention.

The driver 203 generates the current and voltage which is fed to the transmitter coil 103. The driver 203 is typically a drive circuit in the form of an inverter which generates an alternating signal from a DC Voltage. The output of the driver 203 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically the output of the inverter is connected to the transmitter coil via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are open and closed with the desired frequency.

The driver 203 accordingly generates a drive signal having a given operating frequency and applies this signal to the primary resonance circuit 201.

In the system of FIGS. 1 and 2, a particularly advantageous way of controlling the resonance frequency is provided. In the approach, the primary resonance circuit 201 is controlled in dependence on the drive signal driving the primary resonance circuit 201 thereby inherently allowing the operating frequency and the primary resonance frequency to be automatically linked together. Indeed, the approach allows the operating frequency and primary resonance frequency to automatically and inherently be substantially the same such that the system can simply adapt the operating frequency of the drive signal with the effective primary resonance frequency automatically and inherently being adapted to directly follow. The approach can specifically ensure that each cycle of the effective resonance of the primary resonance circuit 201 has the same duration as the corresponding cycle of the drive signal. In addition, the approach allows for this to be achieved with very low additional complexity and with a very low control overhead.

Figure 5:
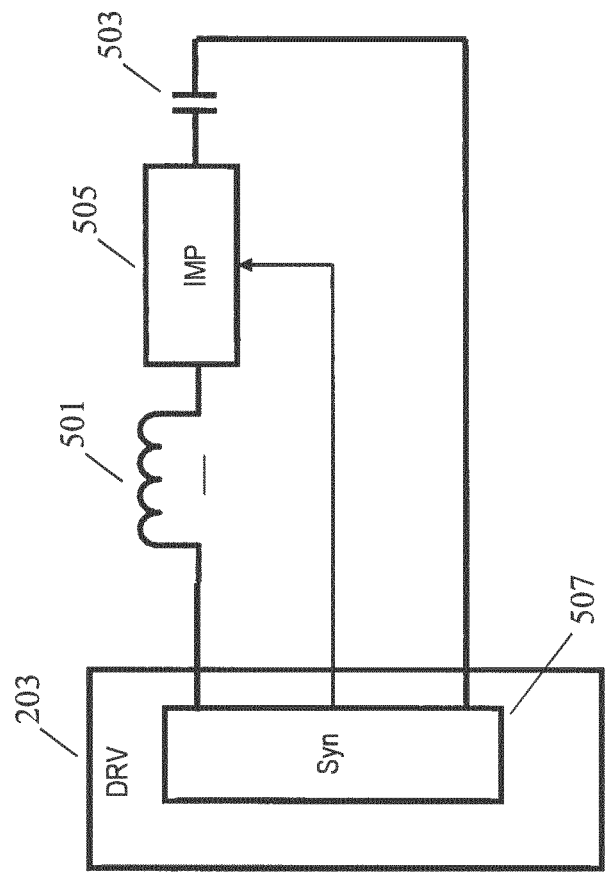
FIG. 5 illustrates an example of elements of a power transmitter in accordance with some embodiments of the invention.

FIG. 5 illustrates elements of a power transmitter in accordance with an example of such an approach.

In the example, the power transmitter comprises an inductive impedance and a capacitive impedance forming a resonance circuit.

In the specific example, the inductive impedance corresponds directly to an inductor but it will be appreciated that in other embodiments the inductive impedance may be any one port/two-terminal element which has an at least partial inductive impedance, i.e. which has an inductive reactance component, or in other words which has a complex impedance with a positive imaginary part. Thus, the inductive impedance may be a linear two-terminal circuit or (equivalent) component for which the voltage at the terminals is at least partly dependent on a derivative of the current through the component/circuit.

Similarly, in the specific example, the capacitive impedance corresponds directly to a capacitor but it will be appreciated that in other embodiments the capacitive impedance may be any one port/two-terminal element which has an at least partial capacitive impedance, i.e. which has a capacitive reactance component, or in other words which has a complex impedance with a negative imaginary part. Thus, the capacitive impedance may be a linear two-terminal circuit or (equivalent) component for which the current through the circuit/component at the terminals is at least partly dependent on a derivative of the voltage across the terminals.

It will be appreciated that in most embodiments, the resistive part of the inductive and capacitive impedance will typically be much smaller, and often negligible compared to the reactance component. This will ensure that the oscillations are relatively undampened, i.e. it will provide a relatively high Q for the resonance circuit.

For clarity and brevity, the following description will focus on the inductive impedance being an (ideal) inductor 501, and specifically the transmitter coil 103 of FIGS. 1 and 2, and the capacitive impedance being an ideal capacitor 503. However, it will be appreciated that any reference to inductor 501 may as appropriate be replaced by a reference to an inductive impedance or reactance, and that any reference to capacitor 503 may as appropriate be replaced by a reference to a capacitive impedance or reactance. For brevity, the pair of the inductor 501 and the capacitor 503 will also be referred to as the resonating components.

The inductor 501 and capacitor 503 are coupled together in a resonant configuration. In the example, the inductor 501 and capacitor 503 are coupled in series resonance but it will be appreciated that in other embodiments they may be coupled in a parallel resonance configuration.

The inductor 501 and capacitor 503 will exhibit a natural resonance frequency corresponding to the resonance frequency of a resonance circuit comprising only the inductor 501 and the capacitor 503. As is well known, the resonance frequency for such a circuit is by $1/2\pi\sqrt{LC}$ where L is the inductance of the inductor 501 and C is the capacitance of the capacitor 503.

However, in the system of FIG. 5, the power transmitter further comprises a frequency modification circuit 505 which is arranged to control the resonance frequency for the resonance circuit by slowing a state change for the capacitor 503 and/or the inductor 501. The frequency modification circuit 505 can be considered part of the resonance circuit (or may be considered fully or partly external to this). It will also be appreciated that although the frequency modification circuit 505 is in FIG. 5 shown as single two terminal element coupled in series between the inductor 501 and the capacitor 503, this is merely an example and that other configurations will be used in other embodiments. For example, the frequency modification circuit 505 in the example of FIG. 5 has only two terminals but it will be appreciated that in other embodiments, the frequency modification circuit 505 may have more terminals and may be connected to other parts of the circuit, including e.g. to power supply rails for the driver.

The frequency modification circuit 505 is arranged to modify the resonance frequency by slowing a state change for one or both of the inductor 501 and the capacitor 503. The state of the inductor 501 and the capacitor 503 may be considered to be represented by the current energy values for the component, and specifically may be considered to correspond to the current of the inductor 501 ($E=\frac{1}{2}LI^2$) and the voltage of the capacitor 503 ($E=\frac{1}{2}CV^2$).

In a conventional resonance circuit formed by a capacitor and inductor, the resonance is achieved by the continuous and periodic phase change that results from the energy flow back and forth between the capacitor (where energy is stored as electrical potential energy) and the inductor (where energy is stored as magnetic potential energy). The speed of state changes and the energy flow in such a system are given by the values of the capacitor and the inductor and this results in the oscillations at the natural resonance frequency of $$f_n = \frac{1}{2\pi\sqrt{LC}}.$$

However, in the system of FIG. 5, the resonance circuit is not allowed to simply perform a free running oscillation but rather the frequency modification circuit 505 slows down the state change for at least one of the inductor 501 and the capacitor 503 during a fractional time interval of some, and typically all of cycles.

The state change is thus slowed during the fractional time interval relative to the state change of a free running resonance circuit comprising only the capacitor 503 and the inductor 501.

Specifically, the state change is slowed by impeding the energy flow between the capacitor 503 and the inductor 501 (by slowing the energy flow from the inductor 501 to the capacitor 503, from the capacitor 503 to the inductor 501, or both from the inductor 501 to the capacitor 503 and from the capacitor 503 to the inductor 501). In a resonant circuit positive current flows from the inductor 501 to the capacitor 503 for half of a resonating cycle, and from the capacitor 503 to the inductor 501 for the other half of a resonating cycle. In many embodiments, the slowing of the energy flow may be achieved by impeding the current flowing between the resonating components. In many embodiments, the frequency modification circuit 505 may be arranged to impede current from the inductor 501 to the capacitor 503, e.g. by leading (some or all of the) current of the inductor 501 away from the capacitor 503 (including potentially leading both negative and positive currents away from the capacitor 503). In other embodiments, the frequency modification circuit 505 may be arranged to impede current from the capacitor 503 to the inductor 501, e.g. by disconnecting the capacitor 503 from the inductor 501 during the fractional time interval (thereby also setting the voltage across the inductor to zero, i.e. both the current and the voltage is set to zero for the inductor).

In these examples, the current flow between the resonating components is thus reduced or even prevented completely during the fractional time interval. During this fractional time interval, the state change of at least one of the components will be slowed or stopped completely. If this is performed during a number of cycles, and specifically in every cycle, the effect will be that the resonance circuit will behave as if resonating at a lower frequency than the natural resonance frequency for the free running resonance circuit configuration. This lower frequency will be referred to as the effective resonance frequency of the resonance circuit.

The frequency modification circuit 505 may in this way control and adjust the effective resonance frequency to be lower than the natural resonance frequency. The actual effective resonance frequency is in the system of FIG. 5 controlled by the frequency modification circuit 505 being capable of varying the timing/duration of the fractional time interval. Thus, the longer the fractional time interval is, the larger the effect of slowing the state change will be, and thus the lower will be the effective resonance frequency.

In the system of FIG. 5, the frequency modification circuit 505 is not merely independently controlled to provide a desired resonance frequency. Rather, the operation of the frequency modification circuit 505 is closely integrated with the driving of the resonance circuit 201 and thus with the power transfer and general operation of the power transfer system.

Specifically, in the system of FIG. 5, the driver 203 generates a timing signal and feeds this to the frequency modification circuit 505. The timing signal includes transitions that indicate when the fractional time interval should start, end, or both (there may be other transitions that are ignored). The frequency modification circuit 505 is arranged to align the fractional time intervals to these transitions. A transition is typically a change in a signal parameter, such as typically a change in a signal level. However, in some scenarios a transition may be a change in another signal parameter, such as for example a change in a phase or frequency of a signal or a (partial) signal component of a signal.

Thus, the transitions of the timing signal controls the timing of the fractional time interval, and specifically controls a start time, an end time or both the start and end time. The frequency modification circuit 505 accordingly sets the start and/or end time of the fractional time interval from the timing signal. Typically, the timing signal is a switch signal which is used to control a switch of the frequency modification circuit 505 which can activate/deactivate the impeding of the energy flow, i.e. it can activate/deactivate the slowing of the state change. The timing signal may include transitions which can be detected by the frequency modification circuit 505 and used by this to directly or indirectly control a switch for switching in and out current impeding. The frequency modification circuit 505 typically aligns a start or end time with the transitions by switching the slowing in or out substantially at the same time as the corresponding transition (say within $\frac{1}{50}^{th}$ of a cycle time period).

Thus, in the system, the driver 203 controls at least part of the timing of the fractional time interval. Furthermore, the driver 203 is arranged to control the timing signal such that this, and accordingly the fractional time interval, is synchronized to the drive signal. Specifically, the driver comprises a synchronizer 507 which generates the timing signal and time synchronizes this to the drive signal.

Specifically, as will be described with specific examples later, the start and/or end time may be generated to have a fixed time offset to the time of an even within the individual cycles of the drive signal. The event may specifically be the drive signal crossing a signal level threshold (such as e.g. at a zero crossing), when an extreme occurs (a local or global (within the cycle) maximum or minimum), when a transition occurs (e.g. an edge of a square drive signal), or when a switch of a switch circuit (such as a switch bridge corresponding to the example of FIG. 3 or 4) switches. Thus, the start and/or stop time is controlled to have a fixed time offset relative to the time instant of such an event. Accordingly, if the timing of the event in a cycle changes (e.g. due to a change in the frequency/time period of the cycle of the drive signal), the controlled start and/or stop time will change accordingly.

In many embodiments, one of the start and stop times may be controlled to have a fixed time offset with respect to a switch time of a switch circuit generating the drive signal, whereas the other time is controlled to have a fixed time offset relative to a time instant of a signal of at least one of the capacitive impedance 503 and the inductive impedance 501 crossing a threshold.

For example, as will be described later, a diode and a switch may be coupled in series and used to direct current away from the capacitive impedance 503 (e.g. by short circuiting the capacitive impedance 503 or by short circuiting the connection between the capacitive impedance 503 and the inductive impedance 501 to a rail voltage (e.g. of zero). In this arrangement, the switch may be open such that when the voltage over the capacitor (or of the connection point) crosses a threshold corresponding to the diode, this will be begin to conduct. Thus, the start time is given by the signal crossing the threshold. However, the end time is determined to have a fixed time offset relative to a switch time for the switches of a full bridge generating the drive signal. Thus, this time is directly time linked to the generation of the drive signal. Accordingly, if the time period of the drive signal increases from one cycle to the next, the frequency modification circuit 505 may automatically adapt to this change—even within the same cycle.

Thus, in many embodiments, the timing of the fractional time interval is closely linked to the drive signal. This linkage provides a close correspondence between the driving of the resonance circuit 201 and the effective resonance of the resonance circuit 201. The linking of the driving signal and timing signal specifically allows the resonance frequency to automatically be locked to be the same frequency as the operating frequency of the drive signal. Indeed, the synchronizer 507 can synchronize the timing signal, and thus the fractional time interval, such that each cycle time of the resonance circuit 201 is the same as the cycle time for the corresponding cycle of the drive signal. Thus, the approach of controlling the fractional time interval by the driver and this being based on the drive signal can provide a system wherein the resonance frequency is always the same as the drive signal. Indeed, even the individual time periods of each individual cycle time can be controlled to be the same.

The approach not only allows for low complexity, and for example does not require any measurements or detections of any signals of the resonance circuit 201 (such as inductor or capacitor current or voltage), but it can also automatically guarantee that the frequencies are identical.

The approach may provide a number of advantages. In particular, it may reduce, and in many embodiments prevent, intermodulation. It may also in many embodiments provide improved power transfer, and specifically may improve power transfer efficiency. Typically, the power transfer efficiency is increased the closer the primary resonance frequency, the secondary resonance frequency and the operating frequency of the drive signal are to each other. The described approach allows the operating frequency and primary resonance frequency to be closely and automatically linked together while allowing them to be varied to match the secondary resonance frequency. Accordingly, only an adaptation of the drive signal to the secondary resonance frequency may be applied with the primary resonance frequency automatically also being set.

Figure 6:
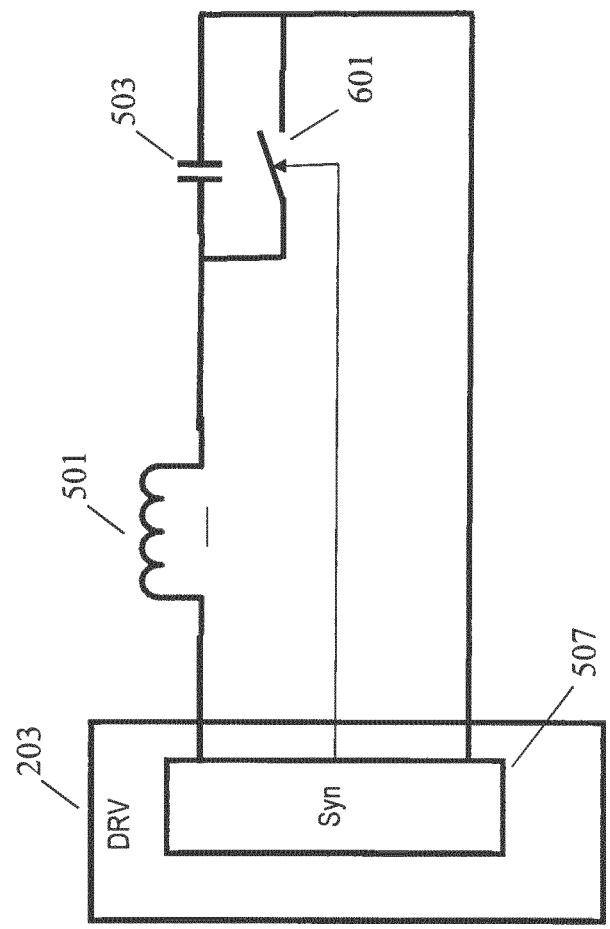
FIG. 6 illustrates an example of elements of a power transmitter in accordance with some embodiments of the invention.

FIG. 6 illustrates an example of the power transmitter of FIG. 5 wherein the frequency modification circuit 505 is arranged to slow the state change of the capacitor 503. In the example, the frequency modification circuit 505 is arranged to divert current from the inductor 501 away from the capacitor 503 during the fractional time interval. The diversion is achieved by a switch 601 which is coupled in parallel with the capacitor 503 and which is arranged to short-circuit this. Thus, the frequency modification circuit 505 may be implemented by a controllable switch.

In the example, the switch 601 is closed during the fractional time interval. The opening and the closing of the switch 601 is controlled by the transitions of the timing signal generated by the driver 203 and is accordingly synchronized to the switch signal. When the switch is closed, the current that is flowing through the inductor 501, and which would otherwise charge or discharge the capacitor 503, is instead diverted through the switch 601. Thus, by short circuiting the capacitor 503, the current bypasses the capacitor 503 and accordingly does not charge the capacitor. In the example, switch 601 is arranged to close at a time instant corresponding to the voltage across the capacitor 503 being zero. At this time, there is substantial current through the inductor 501 (indeed the current will be at the maximum level). However, by short-circuiting the switch, this current is no longer flowing through the capacitor 503 but will instead flow through the switch 601. Accordingly, the short circuit of the capacitor 503 ensures that the voltage is maintained at zero, i.e. the state of the capacitor 503 is kept constant.

It should be noted that the switch 601 accordingly forms a current diversion path which may divert both positive and negative current from the capacitor 503.

After a certain duration, i.e. at the end of the fractional time interval, the switch is opened again thereby resulting in the current flowing through the inductor now flowing into (or out of) the capacitor 503. As a result, the capacitor 503 starts charging and the capacitor voltage changes accordingly. This will result in the effective capacitance of the capacitor 503 as "seen" from the inductor being increased and thus in the resonance frequency being reduced. The resulting effective resonance frequency will depend on the timing of the fractional time interval with increasing duration resulting in reduced effective resonance frequency.

Specifically, by short circuiting the capacitor for part of the period of drive signal, the effective capacitance will be increased.

In order to illustrate this effect, a capacitor C1 may be considered which is charged with an average current $\overline{i(t)}$ for a time t2 to a voltage U1(t2). The voltage U1(t2) may be expressed as:

$$U1(t2) = \frac{1}{C1}\int_0^{t2} \overline{i(t)}dt \rightarrow U1(t2) = \frac{\overline{i(t)}*t2}{C1}.$$

Considering instead another capacitor C2 with a smaller value than C1 but being short circuited from 0 to t1 and charged in the time interval from t1 to t2, this capacitor is charged with the same average current $\overline{i(t)}$ to voltage U1(t2). For C2 the voltage can be determined as:

$$U2(t2) = \frac{1}{C2}\int_0^{t2} \overline{i(t)}dt = \frac{1}{C2}\int_0^{t1} 0 dt + \frac{1}{C2}\int_{t1}^{t2} \overline{i(t)}dt \rightarrow U2(t2) = \frac{\overline{i(t)}*(t2-t1)}{C2}$$

If U1(t2) and U2(t2) are equal at t2, then C1 can be expressed by:

$$C1 = \frac{t2}{t2-t1}*C2.$$

In other words, although capacitor C2 is smaller in value, at time t2 both capacitors are charged to the same voltage. At time t2, capacitor C2 exposes the inductor to the same voltage as capacitor C1. Thus, the effect of the short circuiting is to increase the effective (or apparent) capacitance of the capacitor as "seen" by the inductor.

Figure 7:
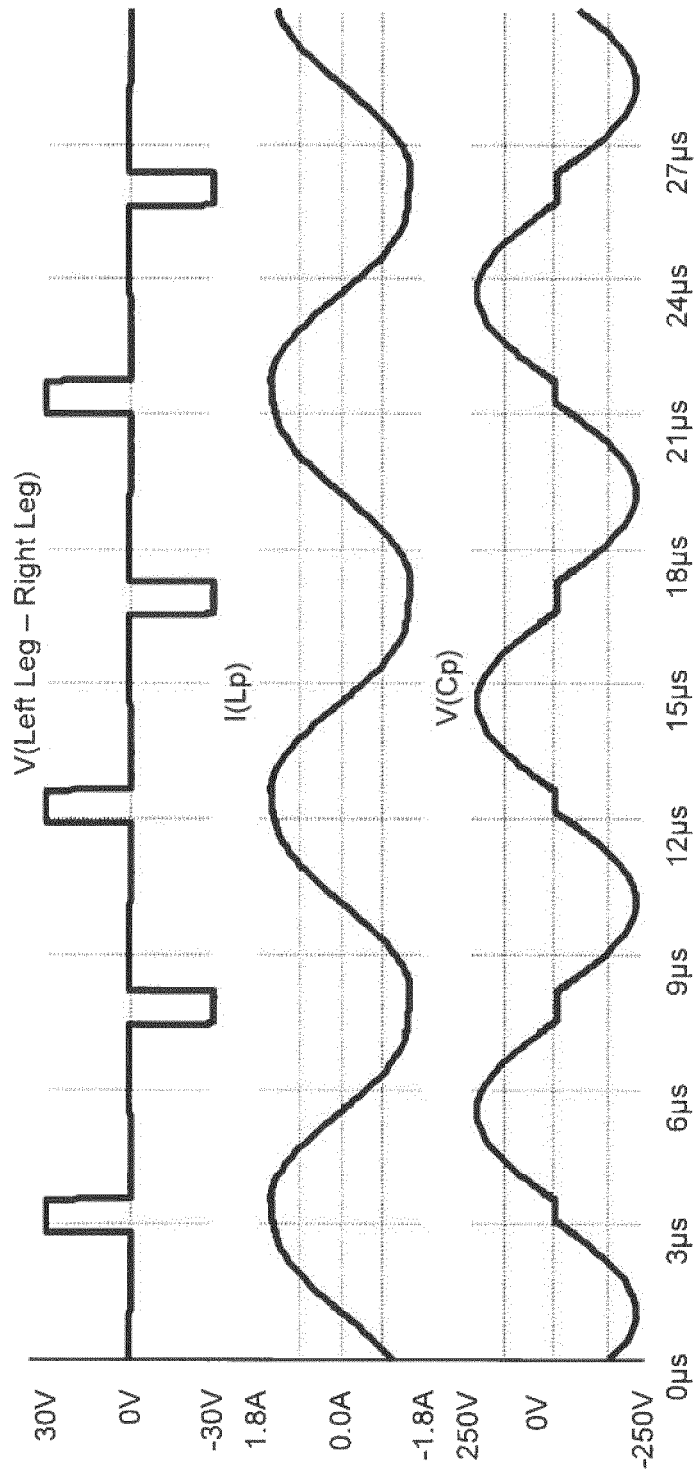
FIG. 7 illustrates examples of signals of a power transmitter in accordance with some embodiments of the invention.

An example of the signals in the circuit of FIG. 6 is provided in FIG. 7. In the example, the inductance of the inductor 501 is Lp=200 uH and that capacitance of the capacitor 503 is Cp=8.2 nF resulting in natural resonance frequency of:

$$fp = \frac{1}{2\pi*\sqrt{Lp*Cp}} = 125 \text{ kHz}.$$

In the example, the upper curve shows the drive signal.

As can be seen, for each cycle, the switch 601 is arranged to short circuit the capacitor 503 during a first fractional time interval (for a positive zero crossing of the capacitor voltage) and during a second fractional time interval (for a negative zero crossing of the capacitor voltage). In each fractional time interval, the voltage is thus kept constant for approximately 1 μs. During this time, the voltage of the capacitor 503 does not change. Similarly, the current through the inductor 501 hardly change either (it is almost constant at the maximum value) due to the inductor 501 not being exposed to a voltage.

As can be seen, the effective resonance frequency is lowered, and indeed in the example, an effective resonance frequency of around 102 kHz is achieved.

The exact effective resonance frequency can be set simply by adjusting the duration of the fractional time intervals. The longer the duration, the lower the frequency.

Further, it can be seen that if the duration between the drive signal pulses is kept constant, the operating frequency of the drive signal can be changed by the duration of the drive signals pulses changing. However, this will directly result in the right edge of the timing signal changing in the same way, and by keeping the left edge of the timing signal coupled to the zero crossing of the capacitor it results in the fractional time intervals changing correspondingly. Accordingly, the resonance frequency will directly follow the drive signal operating frequency and will inherently be the same.

Figure 8:
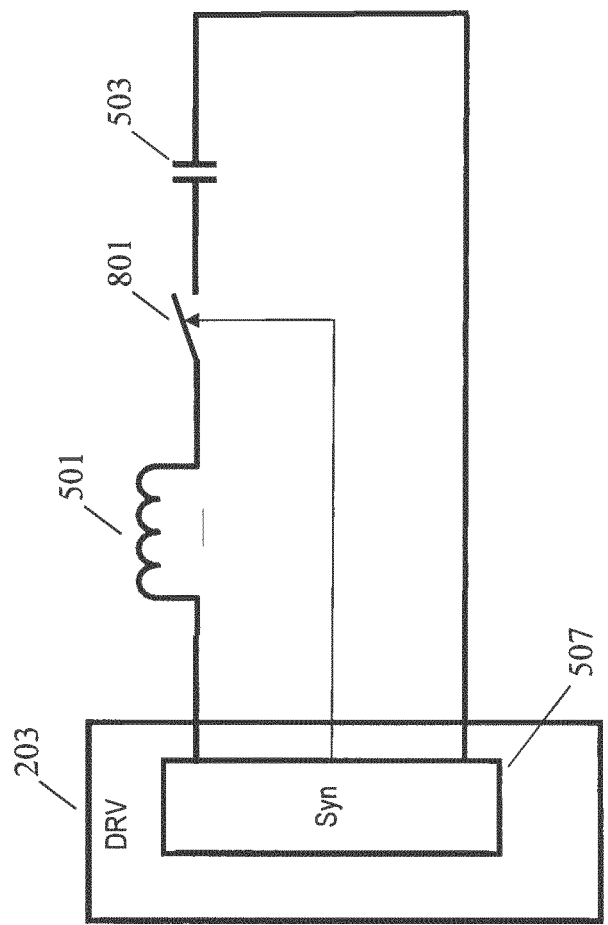
FIG. 8 illustrates an example of elements of a power transmitter in accordance with some embodiments of the invention.

FIG. 8 illustrates another embodiment of the system of FIG. 5. In this example, the frequency modification circuit is arranged to slow the state change for the inductive impedance by impeding current flow (and specifically the rate of change of the current flow) from the capacitive impedance to the inductive impedance during the fractional time interval, or equivalently by reducing the voltage imposed by the capacitor over the inductive capacitance. Specifically, in the example, the frequency modification circuit is arranged to slow the state change for the inductive impedance by blocking current flow from the capacitive impedance to the inductive impedance during the fractional time interval, or equivalently by setting the inductor voltage to zero.

In the example, the current from the capacitor 503 to the inductor 501 is blocked by a switch 801 which is in series with the inductor 501. In the example, the driver 203 is arranged to effectively disconnect the coupling between the capacitor 503 and the inductor 501 for part of resonance cycle. The driver 203 synchronizes the switch 801 to the drive signal, and in principle operates as described for the example of FIG. 6. Indeed, in example of FIG. 6, the switch 601 is arranged to freeze the voltage across the capacitor 503 at zero by controlling the current through the capacitor 503 to be zero. In the example of FIG. 8, the switch 801 is arranged to freeze the current through the inductor 501 at zero by disconnecting the inductor 501 from the capacitor 503 and so removing the influence of the voltage of the capacitor on the inductor. Thus, the two approaches are equivalent with the consideration that operation of a capacitor and inductor are the same when the roles of current and voltage are swapped. Indeed, the signals of FIG. 7 could also apply to the example of FIG. 8 if the curves for inductor current and capacitor voltage are swapped with respectively capacitor voltage and inductor current.

It should also be noted that in the provided examples, the state change of both the capacitor 503 and the inductor 501 are slowed, or substantially frozen, during the fractional time interval. Indeed, in the example of FIG. 6, during the fractional time interval, no current reaches the capacitor 503 and the voltage is constant at zero. However, thus also sets the voltage across the inductor 501 to zero and thus the inductor current is substantially constant, i.e. there is substantially no state change for the inductor 501. Similarly, in the example of FIG. 8, during the fractional time interval, no current can flow from the capacitor 503 and accordingly the voltage across the capacitor 503 will be substantially constant, i.e. there is substantially no state change for the capacitor 501.

In the previous examples, the start of the fractional time intervals have been synchronized with (and specifically aligned to) the zero crossings of respectively the inductor voltage and the capacitor current. In particular, the start time of the fractional time intervals are aligned with the zero crossings of respectively the capacitor voltage and the inductor current. This provides particular advantages when the current flow between the capacitor 503 and inductor 501 is reduced completely to zero during the fractional time intervals. However, it will be appreciated that in some embodiments, more gradual reductions in the current flow may be used.

It will be appreciated that the slowing of the state change, and the energy flow between the capacitor 503 and the inductor 501, may be achieved by reducing rather than completely preventing current flow between the resonating components. The reduced current may for example be achieved through a current regulating circuit which e.g. could be controlled in real time by a microcontroller.

Figure 9:
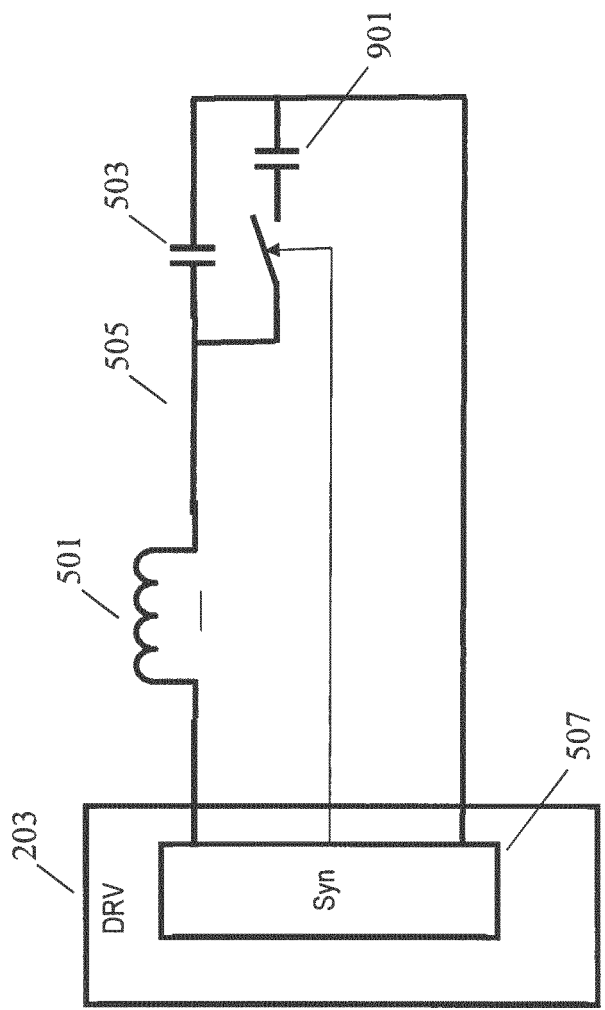
FIG. 9 illustrates an example of elements of a power transmitter in accordance with some embodiments of the invention.

However, as another example, the reduction may e.g. be achieved by including an additional capacitor or inductor during the fractional time intervals. For example, in the example of FIG. 9 an additional current reduction capacitor 901 is inserted in series with the switch of FIG. 6. During the fractional time interval, the switch 601 does not short circuit the capacitor 503 but inserts the current reduction capacitor 901 in parallel. This results in the current to the capacitor 503 being reduced as part of the current flows into the current reduction capacitor 901 during the fractional time interval thereby reducing the state change of the capacitor 503 and so the voltage that the capacitor 503 imposes on the inductor. (the current reduction capacitor 901 is charged and discharged together with the capacitor 503).

Figure 10:
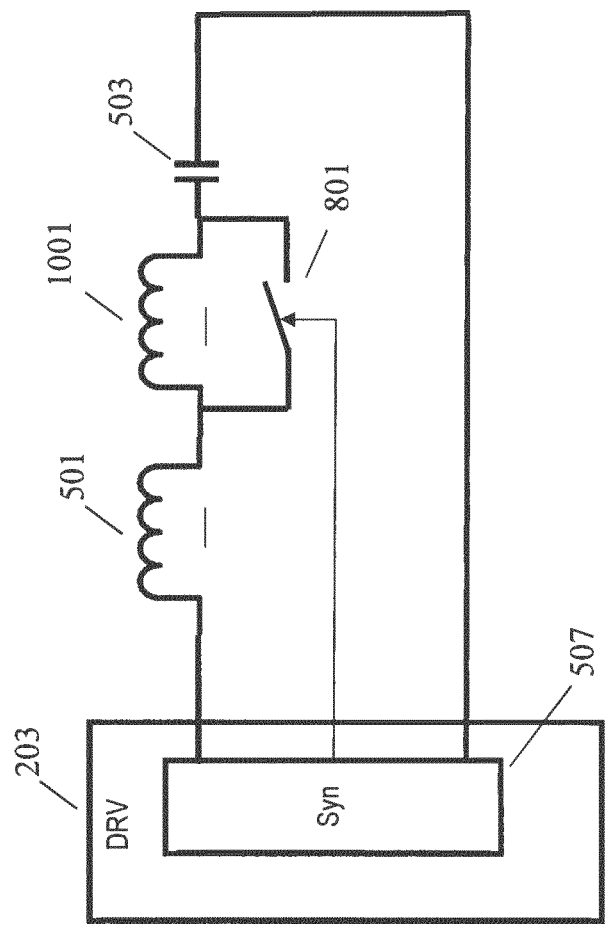
FIG. 10 illustrates an example of elements of a power transmitter in accordance with some embodiments of the invention.

The corresponding example for the inductor 501 is shown in FIG. 10. In this example, a current reducing inductor 1001 is inserted in series with the inductor 501 and the switch 1003 is coupled in parallel with the current reducing inductor 1001. In this example, the switch 1003 is open during the fractional time interval resulting in the effective inductance being increased. Accordingly, the current change through the inductor is reduced (as the voltage that the capacitor 503 imposes is now divided over the inductors 501 and 1001 and so the resulting voltage that the capacitor 503 imposes on the inductor 501 is reduced) during the fractional time interval. At the end of the fractional time interval, the switch 1003 is closed thereby short circuiting the current reducing inductor 1001.

In the following, the operation of the system will be described further with reference to a system wherein the driver 203 comprises a switching bridge/inverter for generating the drive signal. The switching bridge may specifically be a half-bridge or a full-bridge corresponding to the examples of FIGS. 3 and 4.

In the example, the driver 203 furthermore generates the timing signal to have transitions that directly control the fractional time interval. Specifically, the signal is generated to have transitions occurring at times corresponding (and typically being substantially identical, say within $\frac{1}{50}^{th}$ of a cycle time) to the start time of the fractional time interval, at times corresponding (and typically being substantially identical, say within $\frac{1}{50}^{th}$ of a cycle time) to the end time of the fractional time interval, or both at times corresponding (and typically being substantially identical, say within $\frac{1}{50}^{th}$ of a cycle time) to the start time and end time of the fractional time interval.

Furthermore, in the examples, the driver 203 is arranged to synchronize the timing signal to one (or more) of the switch signals controlling the switches of the switch bridge. Thus, as the drive signal is generated by the switching of the switches in the switch bridge, the synchronization of the timing signal, and thus of the fractional time intervals, to the switch signal also provides a synchronization to the drive signal.

Figure 11:
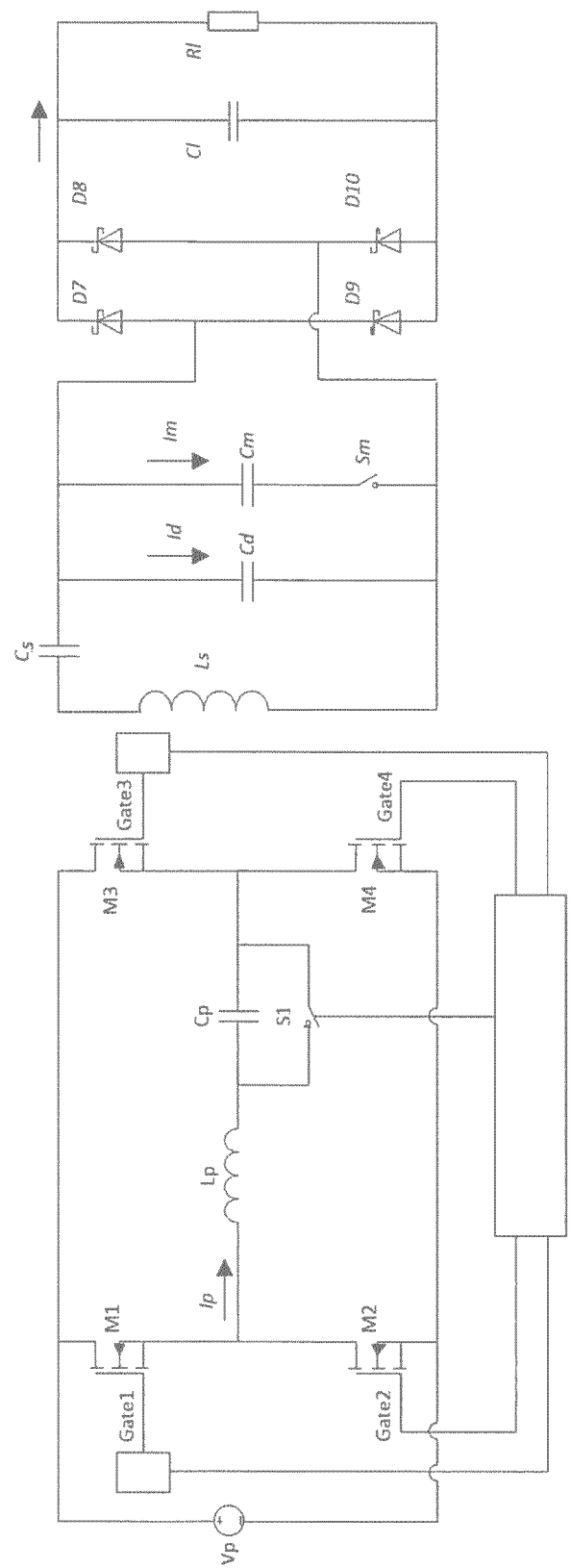
FIG. 11 illustrates an example of elements of a power transmitter in accordance with some embodiments of the invention.

FIG. 11 shows an example of an electrical model of elements of an example of the inductive power transfer system of FIGS. 1 and 2.

The primary resonance circuit 201 is represented by the components $C_p$, and $L_p$, (corresponding to the capacitor 503 and the inductor 501). The driver is represented by $V_p$ and the switch bridge formed by switches M1-M4 which in the specific example are FETs. The secondary resonance circuit 205 is represented by the components $C_s$, $L_s$. The capacitor $C_d$ creates a resonance at 1 MHz, which enables power transmitters that use a moveable coil to locate the power receiver (e.g. in accordance with the principles described in the Qi Wireless Power Specification (version 1.0)). The capacitor $C_m$ and switch $S_m$ represent load modulation by the power receiver 105. Diodes $D_7$ to $D_{10}$ and $C_1$ and $R_1$ represent the load of the power receiver 105 (with the diodes providing rectification).

Figure 12:
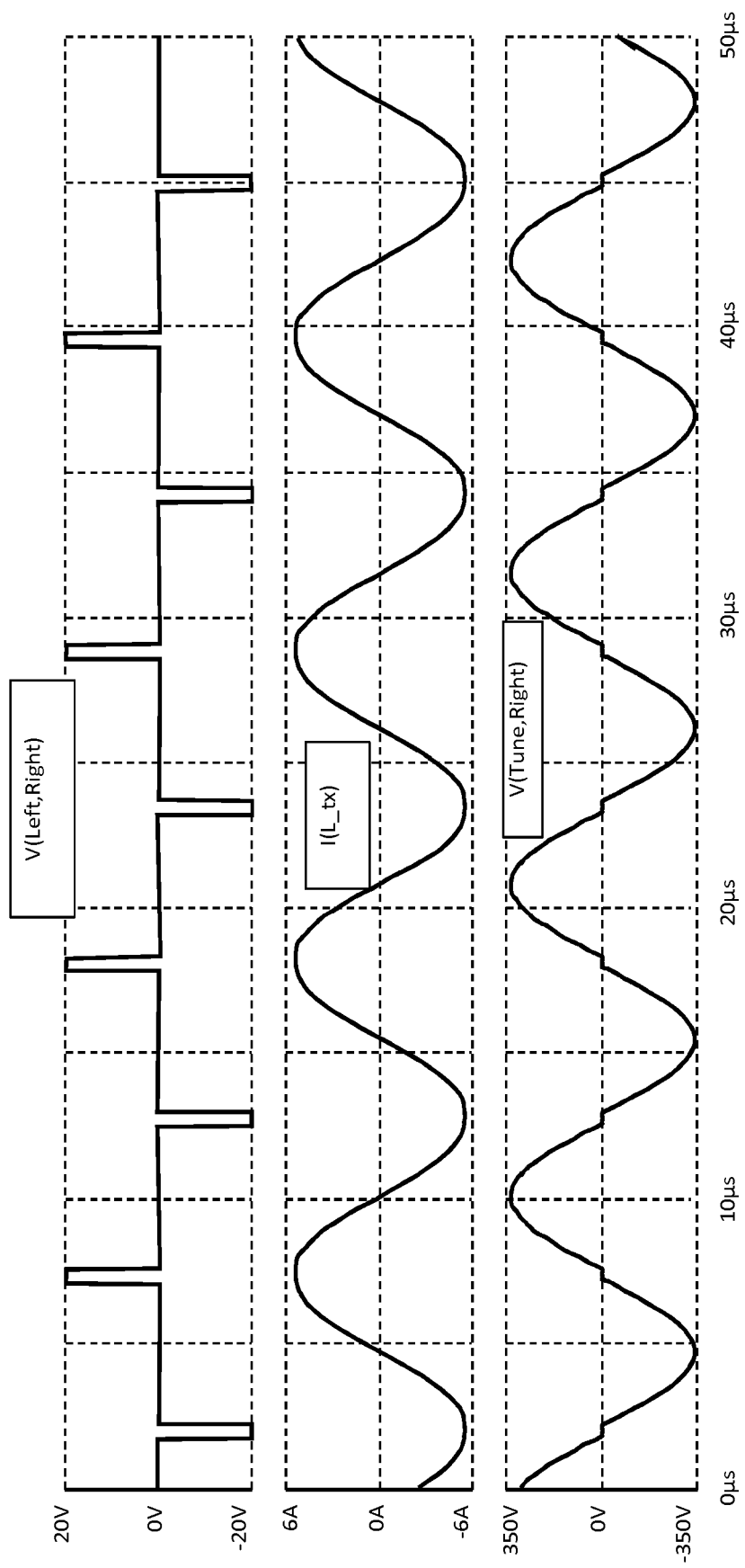
FIG. 12 illustrates examples of signals of a power transmitter in accordance with some embodiments of the invention.

In the example, when switch S1 is opened and closed with an appropriate duty cycle the effective capacitance becomes larger than the capacitance of the capacitor 503 ($C_p$) on its own. If the effective resonance frequency of the power transmitter is desired to be lower than the natural resonance frequency, then switch S1 is closed for a short period of time just after the voltage across $C_p$ passes zero voltage from negative to positive and/or vice versa. This is illustrated in FIG. 12 which first shows the drive signal and the timing signal controlling the switch S, then the current through the inductor 501, and finally the voltage across the capacitor (corresponding to FIG. 7). The drive signal is applied to the resonant circuit with a frequency $f_o$ and duty cycle D of 93 kHz and 10% respectively, i.e. the drive signal has an operating frequency of 93 kHz. In the example, the natural resonance frequency $f_n$ of the resonant tank is 100 kHz. Accordingly, the voltage across the resonance circuit (denoted V(left, right)) should for a free running resonance circuit lag the current $i_p$ (t), meaning that it is in capacitive mode operation. However, in the system of FIG. 11, the switch S1 short circuits the capacitor $C_p$ such that the first harmonic of the voltage V(left, right) and the current $i_p$ (t) are in phase, meaning that the power transmitter operates in resonance. Thus, this resonance is achieved by prohibiting the voltage across capacitor $C_p$ from increasing (or decreasing) just after the event of a zero crossing of the voltage $V(C_p)$ by closing switch S1 with an appropriate duty cycle. This effectively diverts the current from the inductor away from the capacitor $C_p$.

Figure 13:
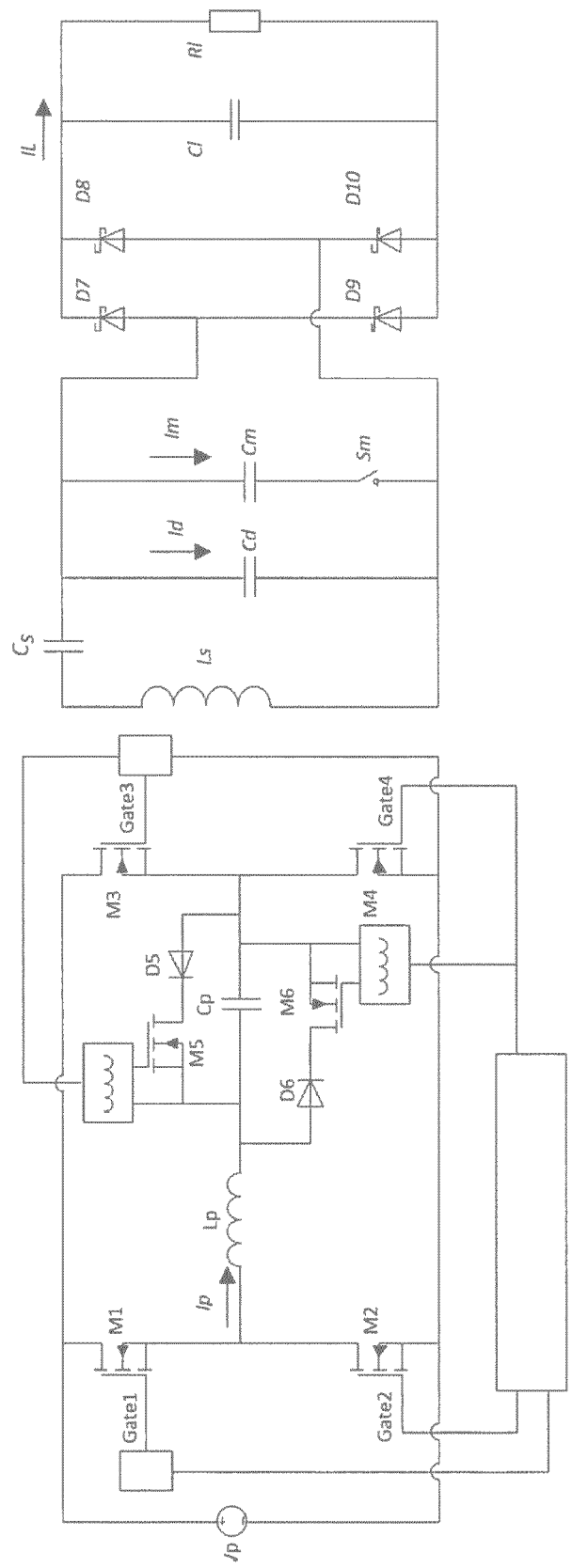
FIG. 13 illustrates an example of elements of a power transmitter in accordance with some embodiments of the invention.

An example of an approach which in many embodiments will be more practical than the example of FIG. 11 is provided in FIG. 13. In the example, of FIG. 13, a simplification of the timing of FIG. 11 is achieved which may provide additional flexibility.

In the example of FIG. 13, the switch is replaced by two current diversion paths with one providing a short circuit for current flowing in one direction, and one for current flowing in the other direction. In the example, each current diversion path includes a rectifier (specifically a diode) which ensures that the current can only flow in one direction for that path.

In this example, the positive current through the resonant tank is now shunted by D6/M6 and the negative current is shunted by D5/M5. Diodes D5 and D6 prevent the body diodes of M5 and M6 from conducting. Switch/FET M6 is controlled by exactly the same signal as Switch/FET M4, i.e. in the example the switch signal for controlling the timing of the fractional time interval is exactly the same as the switch signal for one of the switches of the switch bridge. Indeed, at least one of the begin and end times of the fractional time interval is not only synchronized with, but also coincides with a switching of one of the switches of the switching bridge generating the drive signal.

Indeed, when switch M4 is conducting, the voltage $V(C_p)$ is resonating from negative to positive. When this voltage becomes positive, diode D6 starts conducting immediately because switch M6 is already in the on-state. In this way, the current through $i_p$ (t), commutates naturally from capacitor $C_p$ towards D6/M6 without the need for complex timing control. This is further illustrated in FIG. 14.

A similar situation occurs for the second path of M5/D5. Indeed, in this example, the control switch signal for the switch M5 is directly generated to coincide with the switching of M3.

In the example, each of the current diverting paths (D5/M5 and D6/M6) accordingly comprises both a switch and a rectifier. This allows a more flexible timing of the fractional time interval.

Specifically, the use of both a switch and a rectifier allows the power transmitter to align one of the start time and the end time of the fractional time intervals to the transitions in the timing signals whereas the other is automatically generated by the rectifier, i.e. it is determined by the rectifier switching between a conductive and non-conductive state.

In the example of FIG. 13, the switch may be switched into a conductive state during the time when the voltage of the capacitor is negative. However, due to the diode D6, the current diversion path of D6/M6 does not conduct any current and thus does not divert any (negative or positive) current from the capacitor 503. Thus, the exact timing of the switching on of the switch M6 is irrelevant, as this does not constitute the beginning of a fractional time interval in which current is diverted away.

However, shortly after a zero crossing of the voltage across the capacitor 503, the diode D6 will begin to conduct (as soon as the voltage is sufficiently high to provide sufficient forward bias). Thus, when the diode D6 switches from the non-conductive to the conductive state, the current diversion path begins to divert current from the inductor 501 away from the capacitor 503. Thus, the start of the fractional time interval is controlled by the diode switching from the non-conductive to the conductive state and is not dependent on when the switch M6 switches. Thus, the start time of the fractional time interval may not be aligned to the timing signal.

The current diversion path will continue to divert current until the switch M6 is switched to the open state (as long as there is current flowing from the inductor in the forward direction of diode D6). Thus, the end time of the fractional time interval is aligned with the transitions of the timing signal, and thus with the transitions of the switch signal for switch M4.

Figure 14:
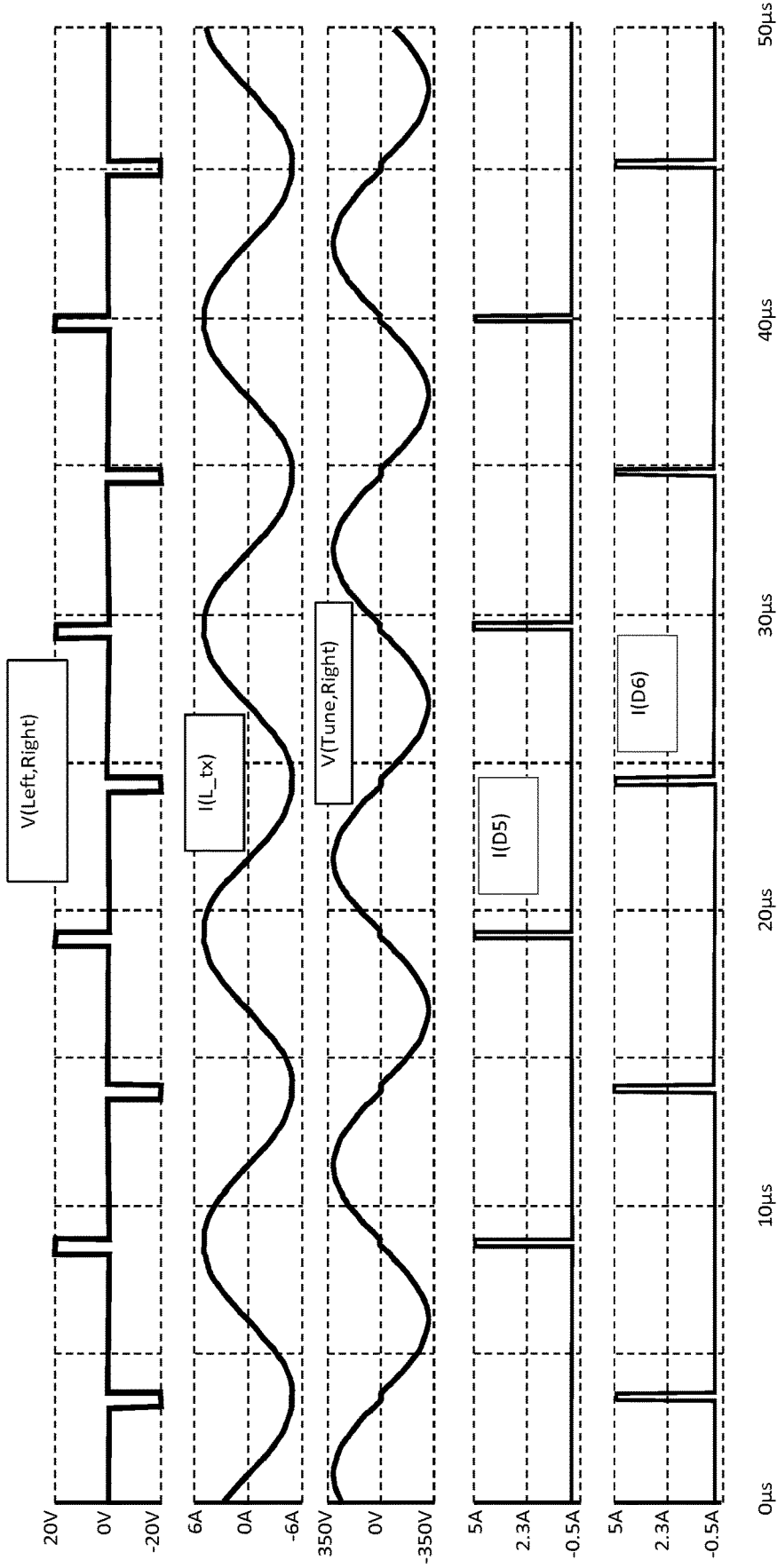
FIG. 14 illustrates examples of signals of a power transmitter in accordance with some embodiments of the invention.

Accordingly, in the example of FIG. 13, and as illustrated by FIG. 14, the power transmitter is arranged to align the start time of the fractional time intervals to the rectifier (diode D6) switching from a non-conductive to a conductive state whereas the end time is aligned to the transitions in the timing signal, and thus to the transitions in the switch signal. Indeed, the same switch signal may be used both for the switch of the current diversion path and for the switch of the switch bridge.

It will be appreciated that in other embodiments, the same principles may e.g. be applied to control the end of the fractional time interval in response to a rectifier switching conductive state, including potentially ending the fractional time interval when a rectifier switches from the conductive to the non-conductive state. Such implementations may e.g. be useful when blocking of current to the inductor is employed, e.g. instead of diverting current from the capacitor.

The approach has a number of particular advantages. Indeed, it allows for an automatic synchronization of the start of the fractional time intervals to zero crossings of the capacitor voltage and/or of the inductor current. Thus, it automatically aligns the start of the fractional time interval to times when the components may easily be short circuited or disconnected, thereby allowing a lower complexity embodiment.

Another significant advantage is that it provides additional flexibility in generating the drive signal and the switch signal for the switch bridge. Specifically, as the fractional time intervals are only synchronized to one edge of the switch signals, the other can (within reason) be freely varied. This specifically allows the duty cycle to be varied and thus allows the driver to dynamically vary the power level of the generated power transfer signal without changing e.g. the operating frequency or the amplitude level of the signal.

Indeed, the approach allows for a much simplified generation of the drive signal. Specifically, instead of switching on the corresponding switches of the switch bridge (M1/M4 and M2/M3 respectively) only during the relatively short time interval in which drive signal is active (i.e. as in the first curve of FIG. 14), all of the switches can be operated by substantially square wave signals with a duty cycle of 50%. The duty cycle of the drive signal may then be generated by the relative phase difference between these drive signals. However, as only one of the edges controls the timing of the fractional time intervals, this does not affect the fractional time interval.

Furthermore, the approach still ensures that the first power receiver 105 and the operating frequency are inherently locked together with the same value. Specifically, this results from the fact that the oscillations of the resonance circuit 201 are effectively restarted for every cycle of the drive signal.

It should be noted that in the example of FIG. 13, the voltage levels in the system typically requires that the switches controlling the fractional time interval (i.e. switch M5 and M6) are driven through high voltage level shifters, which is typically implemented using two extra pulse transformers.

Figure 15:
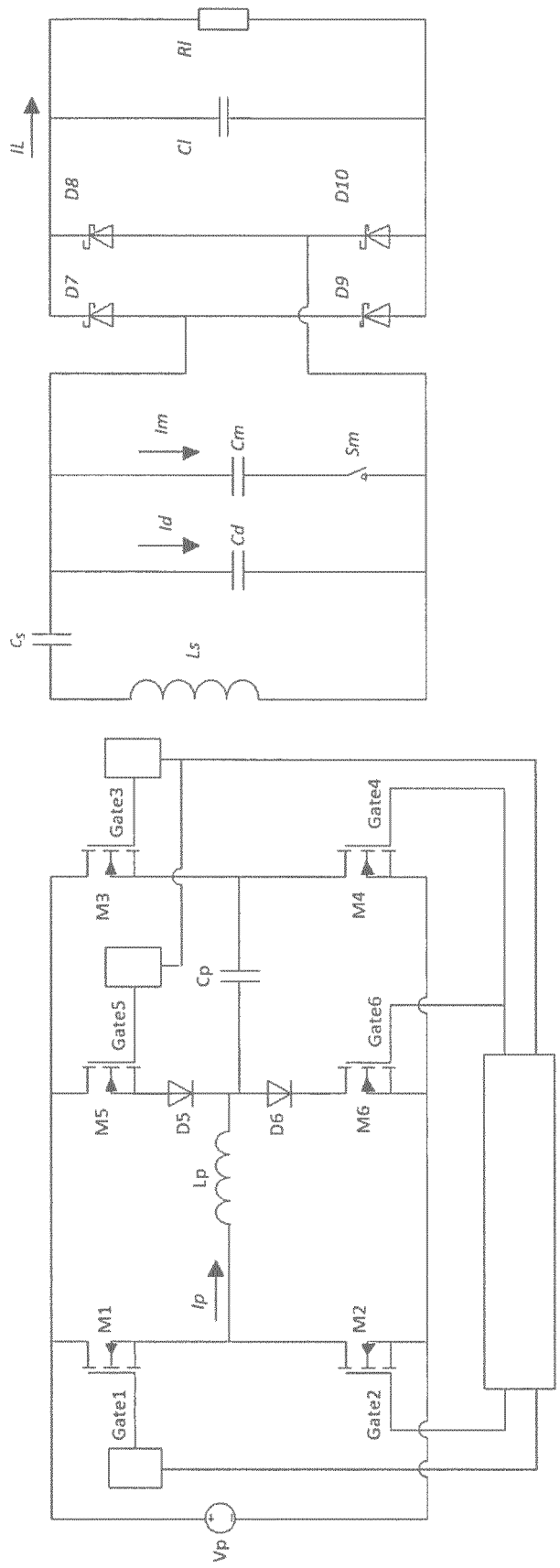
FIG. 15 illustrates an example of elements of a power transmitter in accordance with some embodiments of the invention.

However, this may be partly avoided in the system of FIG. 15 (specifically the high voltage level shifter can be avoided for switch M6). In this example, two current diversion paths are coupled between the junction point of the inductor 501 and the capacitor 503 and the power rails for the power supply to the switching bridge.

The operation of the system of FIG. 15 is similar to the example of FIG. 13 and simply provides a different path back to the power supply for the current being diverted. However, an important difference is that switches M5 and M6 are referenced to respectively the voltage rail and ground for the inverter, i.e. to fixed voltages. This may substantially facilitate driving of the switches, e.g. when these are implemented as MOSFETs. In the example, switch M6 can be implemented by a MOSFET being driven directly by the same switch signal as M4. However, a MOSFET implementing M5 would still require a pulse transformer as the voltage of the source of this MOSFET will have negative voltage values.

Figure 16:
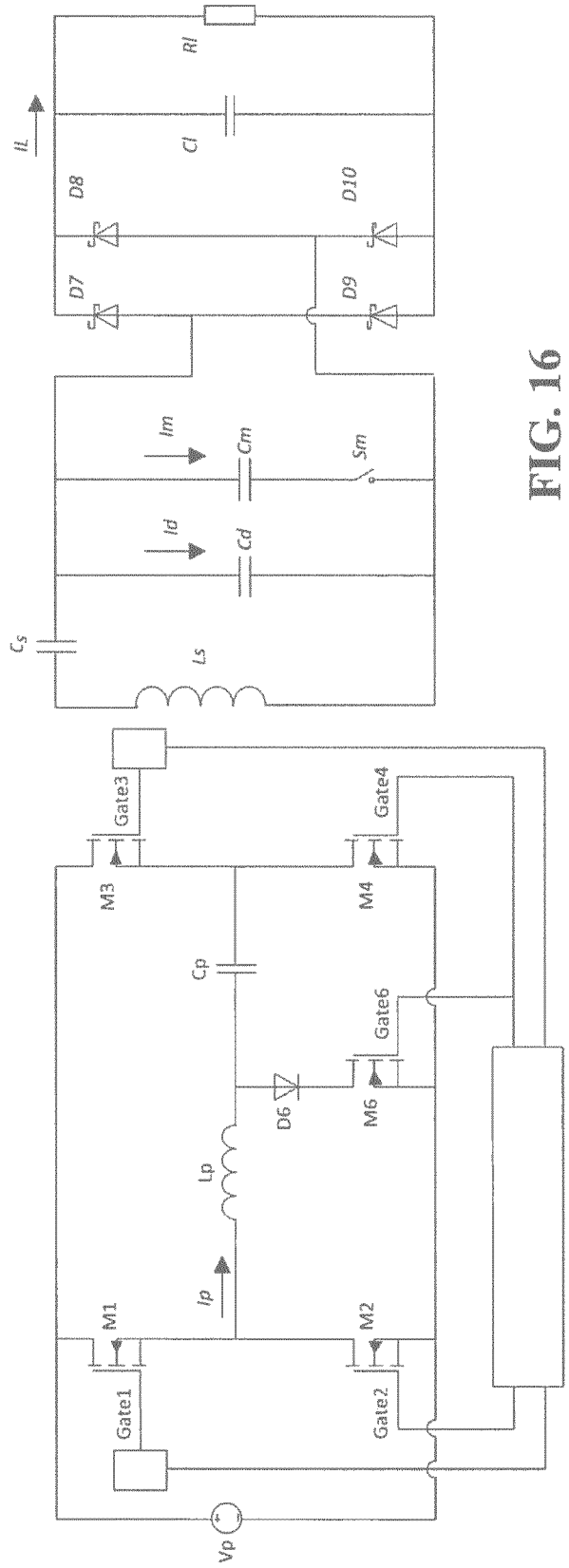
FIG. 16 illustrates an example of elements of a power transmitter in accordance with some embodiments of the invention.

FIG. 16 illustrates a modification of the system of FIG. 15. In this example, the current diversion path to the voltage rail, i.e. the current diversion path comprising D5/M5 have been completely removed. Although this system introduces fractional time intervals only for half of the zero crossings (i.e. only one zero crossing per cycle), it has been found to provide an effective adjustment of the effective resonance frequency.

Thus, in the system of FIG. 16, a current diversion path comprises a switch and rectifier coupled in a series configuration and with one end of the current diversion path being coupled to the junction point between the inductor and capacitor and the other end of the current diversion path being coupled to the ground supply rail for the switching bridge. In the system, and rectifier aligns the start times of the fractional time intervals to the time when the rectifier switches from a non-conductive to a conductive state, whereas the end times of the fractional time interval are aligned to the switching of switch M4 of the switching bridge.

The approach allows for a very low complexity approach for adapting the resonance frequency of a power transmitter such that it matches the drive signal. The approach can specifically provide an automatic system wherein the frequency of the drive signal is always the same as the resonance frequency of the primary resonance circuit, and vice versa.

Figure 17:
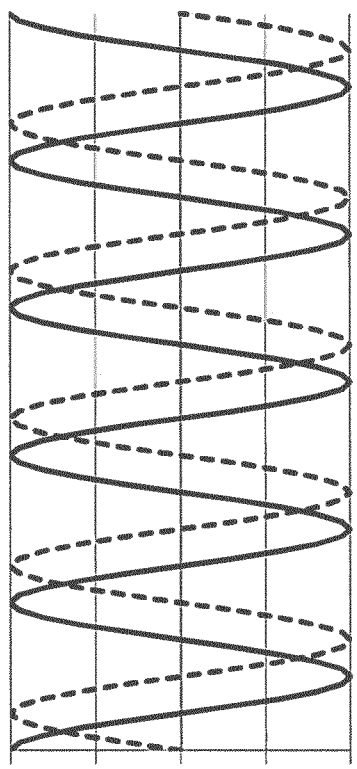
FIG. 17 illustrates an example of elements of a power transmitter in accordance with some embodiments of the invention.
Figure 17:
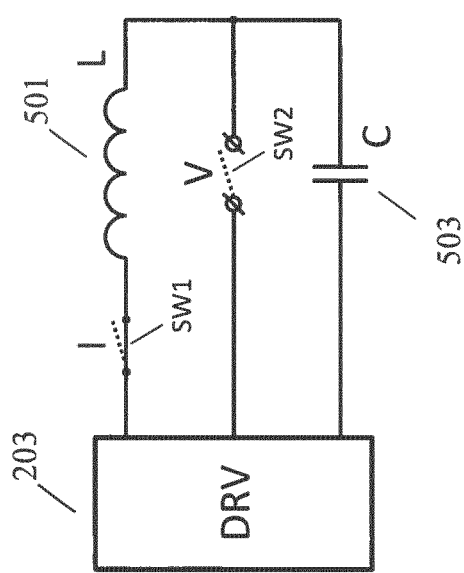

To illustrate the locking of the operating frequency and the primary resonance frequency, the system of FIG. 17 may be considered. The example illustrates the driver 203 driving the resonant circuit comprising the inductor 501 (L) and the capacitor 503 (C). If the driver applies a step voltage to the resonant circuit, it starts to oscillate at the well-known resonance frequency $f=1/2\pi\sqrt{LC}$. These oscillations are visible in the current I (drawn line) running through the system, and the voltage V (dashed line) at the junction between the inductor 501 and the capacitor 503. In the presence of damping, the oscillations die out after some time, leading to a steady state in which the capacitor 503 is charged to the step voltage of the driver 203. In practice, the resonant circuit has a high Q factor, i.e. low damping, which means that the oscillations continue for many periods of the resonant frequency.

If the driver 203 applies a signal at a frequency that is equal to the resonance frequency, the oscillations can be sustained indefinitely, even in the presence of damping. In this case, the very high currents can run through the circuit. However, if the driver 203 applies a signal at a frequency that is different from the resonance frequency, the system will not "swing" very well, resulting in much lower current running through the circuit. In fact, in the latter case, the current and voltage signals in the circuit will contain two frequencies, namely the driving frequency and the resonance frequency, where the resonance frequency will be more pronounced with a higher Q factor of the resonant tank circuit. The two frequencies in the current and voltage signals lead to a beat frequency on their amplitude—this is sometimes also (incorrectly) referred to as intermodulation between the two frequencies. In a wireless power transfer system, which relies on amplitude modulation—as achieved through load modulation on the power receiving side of the system—this can make reliable communications difficult, if not impossible. It is therefore advantageous, if not essential in certain cases, to operate the system at a frequency that is equal to the resonance frequency.

Figure 18:
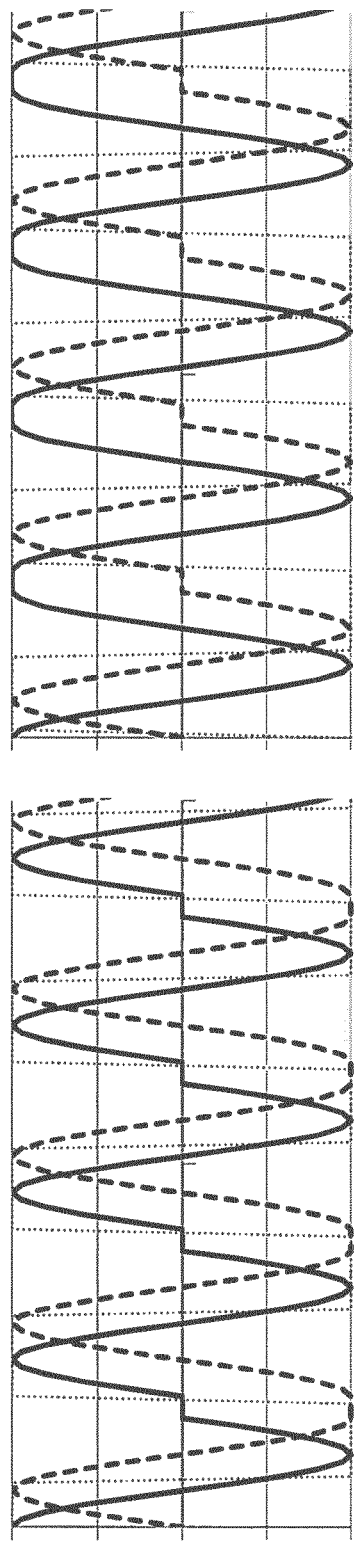
FIG. 18 illustrates examples of signals of a power transmitter in accordance with some embodiments of the invention.

By closing either switch SW1 or SW2 after the completion of a cycle of the oscillations at the resonance frequency, further oscillations at that frequency will be inhibited. In other words, the state of change of the current and voltage signals in the circuit will be slowed down—to zero in this example. Opening the switch again at the start of the next cycle of the driving signal restarts the oscillation at the resonance frequency, as if the driving signal was applied for the first time. This means that the phases of the current signal or voltage signal are reset to match the phase of the driving signal. In other words, the frequency of the cycles in the circuit becomes effectively equal to the driving frequency—but they no longer have a sinusoidal shape. In FIG. 18, the left-hand side shows the resulting waveforms for closing SW1 at a negative-to-positive zero crossing of the current, and the right-hand side figure shows the resulting waveform for closing SW2 at a negative-to-positive zero crossing of the voltage. The drawn waveforms represent the current; the dashed waveforms represent the voltage; and the dotted lines represents the driving signal—in this case a square wave.

It should be noted that depending on the difference between the driving frequency and the resonance frequency, the system may also work to effectively suppress the beats in the current and voltage signals by operating the switch(es) once every few cycles, as opposed to once every cycle. For example, if the driving frequency approaches the resonance frequency, the frequency of the beats increases and the resulting changes in the amplitude take multiple cycles to build up. Resetting the phases every few cycles is in that case sufficient to keep the sensitivity for load-modulation based communications on a sufficient level, while reducing potential losses in the system, which may arise from operating the switch(es).

Synchronizing the operation of the switches can be achieved in many ways such as e.g. described previously for the various different embodiments. Opening the switch is most easily synchronized with an edge—e.g. a rising edge—of a square wave or pulse wave driving signal. For closing the switch, a measurement system can be added to the tank circuit, which triggers on a negative-to-positive zero crossing of the current or voltage signal. Someone skilled in the art will be able to design many kinds of circuits that perform this functionality.

In the case of a wireless power system that comprises a single driver driving multiple tank circuits in parallel, which is an advantageous implementation to achieve greater (lateral) positioning tolerance of the power receiver, it is difficult—if not impossible—to operate the system at the resonance frequency. The reason is that due to natural spread in inductance and capacitance values of the components that are used to implement the wireless power system, each resonant tank circuit typically has a different resonance frequency. By limiting the Q factor of each resonant tank circuit, the current and voltage signal component at the resonance frequency can be kept small relative to the signal component at the drive frequency. This keeps the beats on the amplitude in check, such that communications based on amplitude modulation remain possible. However, a disadvantage of this approach is that a low Q factor requires a relatively high coupling in order to keep the efficiency of the power transfer up to the mark. In other words, the low Q factor does not permit a large distance between the power transmitting and receiving parts of the system.

By inhibiting the free-running oscillations as described above, the beats between the various frequencies in the system—the driving frequency as well as the different resonance frequencies of the multiple resonant tank circuits—can be kept in check, enabling communications by means of amplitude modulation. In other words, it becomes possible to realize a high-Q multi-coil or array-based power transmitter that is able to demodulate amplitude communications from a power receiver that is positioned at a much larger distance.

The Inventors have realized that locking these frequencies closely together can in particular provide improved communication performance when load modulation is used.

In many embodiments, the power transmitter 101 may be arranged to receive data messages from the power receiver 105. Specifically, power transmitter 101 may be arranged to demodulate load modulation of the wireless inductive power signal to determine the corresponding data transmitted from the power receiver 105.

On the physical level, the communication channel from the power receiver 105 to the power transmitter 101 is implemented by using the wireless inductive power signal as a communication carrier. The power receiver 105 transmits data messages by modulating the load of the receiver coil 107. The power receiver 105 may for example do this by connecting and disconnecting a capacitor coupled in parallel to the receive coil 107 thereby changing the resonance, and thus load characteristics of the power receiver 105. These changes result in corresponding variations in the power signal at the power transmitter side, and specifically in variation in the current and voltage of the transmitter inductor 103. These changes are directly or indirectly detected by the power transmitter 101 and used to demodulate the load modulation data from the power receiver 105.

Specifically, the load modulation may e.g. be detected by a change in the amplitude and/or phase of the drive signal current/voltage, by a change in the current/voltage of the transmitter coil 103, and/or a change of current/voltage of a resonance circuit. As another example, the load modulation may be detected by a change in the current of the power supply to the driver 203 (specifically to the inverter/switch bridge).

The power receiver 105 can accordingly load modulate data onto the power signal which the power transmitter 101 can then demodulate. The approach may for example correspond to that described for Qi in "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface (or in subsequent versions of the Specification).

The load modulation is specifically used to adapt the power transfer, and in particular to implement a power control loop that continuously adapts the transmitted power level based on power control messages received from the power receiver 105. The power control messages are communicated by load modulation.

The described approach wherein the operating frequency and the primary resonance frequency are automatically the same may provide substantially improved performance in many embodiments. Indeed, the Inventors have realized that substantially reduced intermodulation can be achieved by linking these frequencies.

The effect and realization may be illustrated by considering some practical examples. Specifically, the equivalent circuit of FIG. 19 may be considered.

Figure 19:
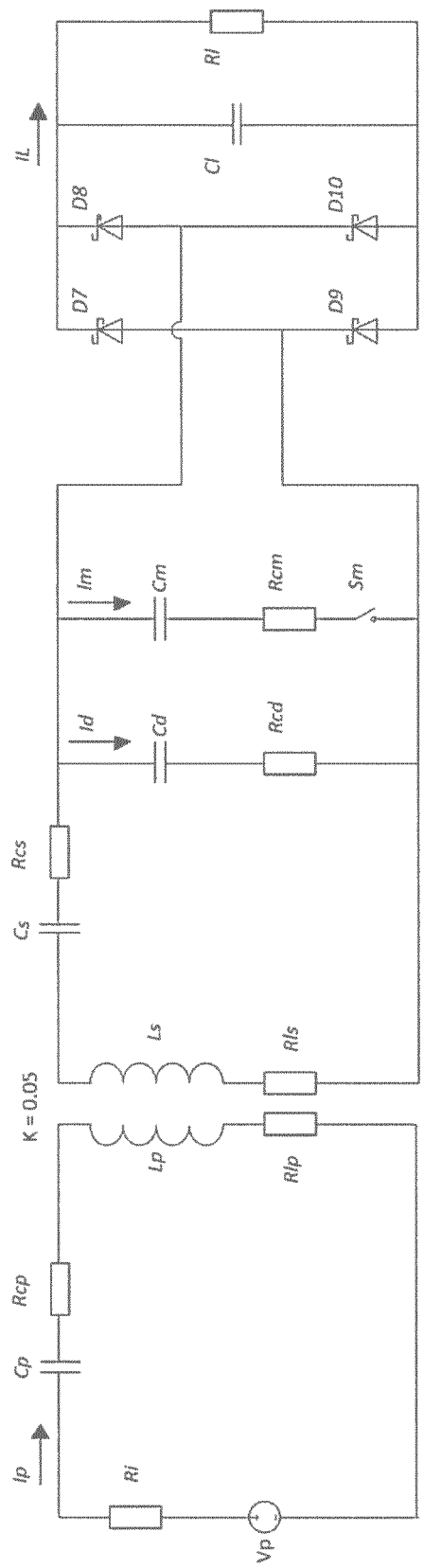
FIG. 19 illustrates an example of elements of a power transmitter in accordance with some embodiments of the invention.

The diagram of FIG. 19 represents a simple electrical model of the inductive power transfer system of FIGS. 1 and 2.

The primary resonance circuit 201 is represented by the components $C_p$, $R_{cp}$, $R_{lp}$, and $L_p$, where the resistors represent losses). The driver is represented by $V_p$ and $R_i$. The secondary resonance circuit 205 is represented by the components $C_s$, $R_{cs}$, $R_{ls}$, and $L_s$, where the resistors represent losses). The capacitor $C_d$ (with resistor $R_{cd}$ representing losses) creates a resonance at 1 MHz, which enables power transmitters that use a moveable coil to locate the power receiver. The capacitor $C_m$ (with resistor $R_{cm}$ representing losses) and switch $S_m$ represent the load modulation by the power receiver 105. Diodes $D_7$ to $D_{10}$ and $C_1$ and $R_1$ represent the load of the power receiver 105 (with the diodes providing rectification).

The circuit has been simulated for values typical of a Qi wireless power transfer system. In such a system, the primary resonance frequency is in the interval of $f_p=(93\pm7)$ kHz, and the secondary resonance frequency is in the interval of $f_s=(100\pm5)$ kHz. The coupling factor k between the two is equal to $M/\sqrt{L_pL_s}$, with M the mutual inductance between the two coils. In the examples, the coupling factor k is set to a value of 0.05.

In the example, the operating frequency $f_o$ and duty cycle D=Ton/T of the drive signal may be varied, e.g. to provide the desired power transfer characteristics.

The circuit has been analyzed with the following exemplary values:

| Power transmitter | | | Power receiver | | |
|---|---|---|---|---|---|
| $L_p$ | 100 | µH | $L_s$ | 20 | µH |
| $f_p$ | 93 | kHz | $f_s$ | 100 | kHz |
| $Q_p$ | 30 | | $Q_s$ | 25 | |
| $v_p$ | 20 | V | $C_m$ | 22 | nF |
| D | 0.1 | | $C_l$ | 10 | µF |
| $R_i$ | 0.5 | Ω | $R_{cs}$ | 0.25 | Ω |
| $R_{cp}$ | 0.25 | Ω | $R_{cd}$ | 0.25 | Ω |
| $f_{ping}$ | 175 | kHz | $R_{cm}$ | 0.25 | Ω |
| | | | $v_{L,0}$ | 5.0 | V |
| | | | $P_{L,0}$ | 5.0 | W |

Figure 20:
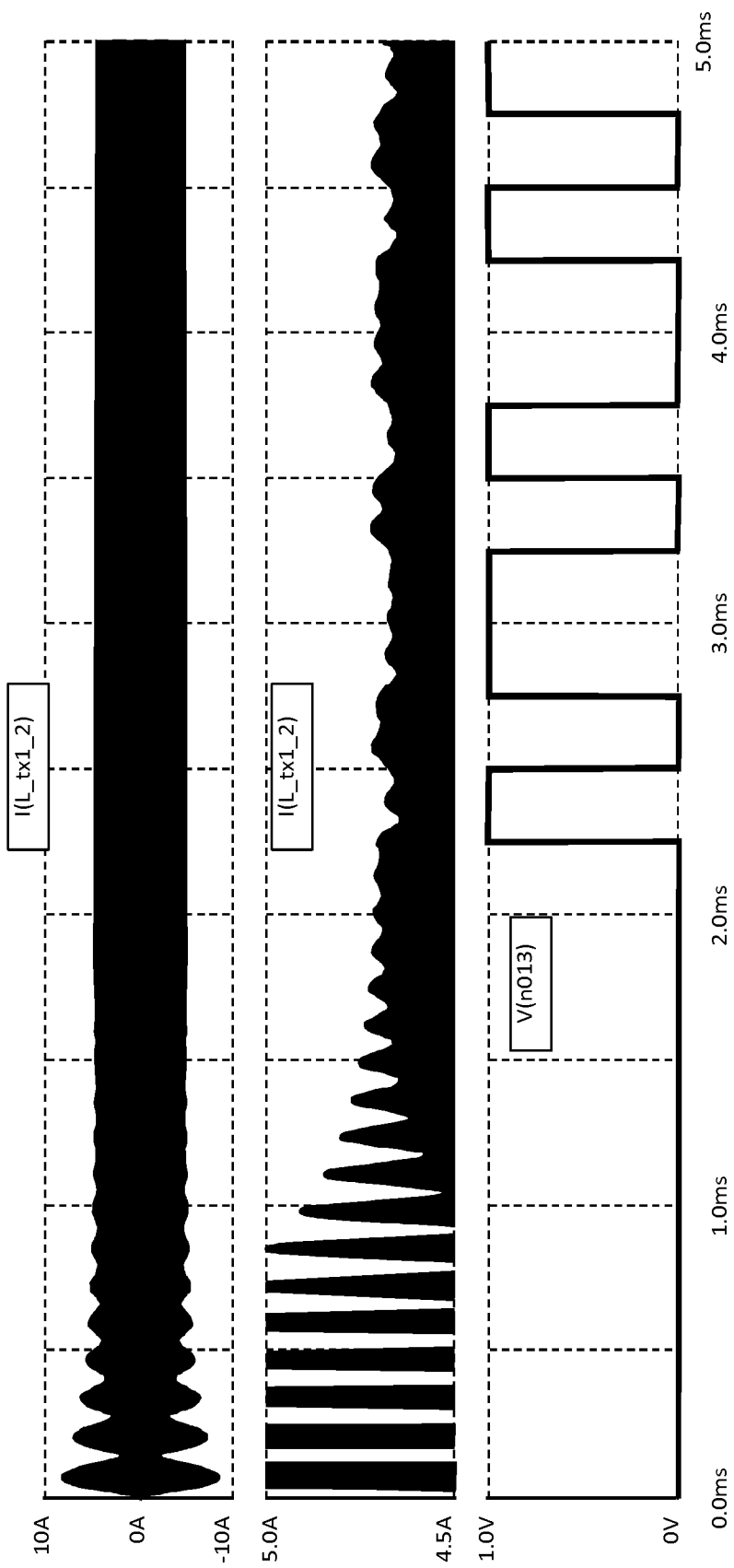
FIGS. 20 and 21 illustrate examples of signals of a power transmitter in accordance with some embodiments of the invention.

FIG. 20 illustrates the simulation results for the following parameters:
k=0.05, $f_o$=100 kHz, $f_p$=93 kHz, $f_s$=100 kHz.

The two first curves illustrate the current through the transmitter coil 103 ($L_p$) with the second curve illustrating a magnified view. The lowest curve shows the load modulation by the power receiver (specifically the switch signal for switch $S_m$).

As can be seen, when the power signal is first switched on, an oscillation occurs. Essentially, the power transmitter operates similarly to an under damped resonance circuit. Indeed, the oscillation can be considered an intermodulation effect between the drive signal and the primary resonance circuit 201. Thus, the oscillation represents intermodulation with a frequency of $f_o - f_p$=7 kHz. It can also be seen that the oscillations gradually subside and are effectively attenuated at t=2.0 ms (mainly due to the load of the power receiver).

In the example, load modulation starts at t=2.25 ms with the example providing a load modulation corresponding to a burst signal with a modulation clock frequency of $f_m$=2 kHz. As can be seen, the step changes of the load modulation effectively excites the intermodulation resulting in oscillations, i.e. the load modulation steps can be considered a step function exciting the under damped resonance circuit. As can be seen, the oscillations are significant and may exceed or substantially reduce the difference caused by the variation of the load modulation data. This may substantially reduce the reliability of the demodulation and even in many scenarios prevent reliable demodulation (compensating for the oscillations in the demodulation will require very complex and typically costly functionality).

Figure 21:
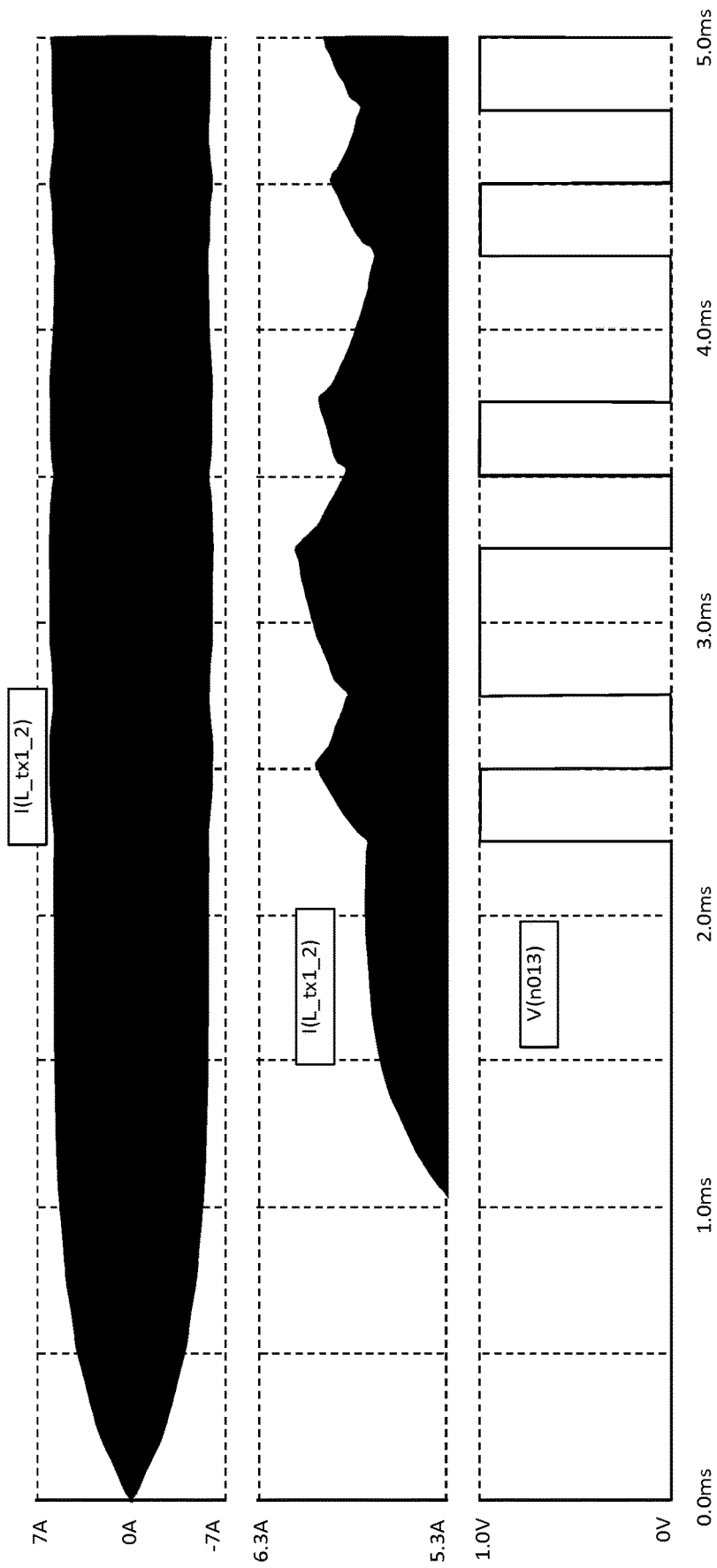

FIG. 21 illustrates the simulation results for the following parameters:
k=0.05, $f_o$=93 kHz, $f_p$=93 kHz, $f_s$=100 kHz.

Thus, in this example the operating frequency and the primary resonance frequency are set to the same value.

As can be seen, this effectively removes the oscillations. Indeed, the circuit may still be considered to correspond to an under damped resonance circuit but no intermodulation effects are present. As a result, the demodulation of the data may be facilitated substantially and a much more reliable demodulation can be performed.

Thus, as illustrated, by ensuring that the operating frequency and primary resonance frequency are the same, improved demodulation of load modulation can be achieved.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter for wirelessly providing power to a power receiver via an inductive power signal, the power transmitter comprising:
   a resonance circuit configured to generate the inductive power signal, the resonance circuit comprising a capacitive impedance and an inductive impedance;
   a driver for generating a drive signal for the resonance circuit, the drive signal having an operating frequency and being configured to generate a timing signal to have transitions corresponding to a change in a signal parameter of the timing signal, the transitions being synchronized to the drive signal; and
   a frequency modification circuit configured to control a resonance frequency of the resonance circuit by slowing a state change for at least one of the capacitive impedance and the inductive impedance for a fractional time interval of each of at least a plurality of cycles of the drive signal, the frequency modification circuit being configured to align one of a start time and an end time for the fractional time interval to at least some of the transitions of the timing signal, and to control another of the start time and the end time to have a fixed time offset relative to a time instant of a signal of at least one of the capacitive impedance and the inductive impedance crossing a threshold.

2. The power transmitter of claim 1, wherein the driver is configured to generate the timing signal to have transitions with a fixed time offset to a time instant of at least one of a zero crossing, a maximum and a minimum of cycles of the drive signal; and the frequency modification circuit is configured determine the at least one of the start time and the end time for the fractional time interval to have a fixed time offset to the at least some transitions of the timing signal.

3. The power transmitter of claim 1, wherein the driver comprises a switching bridge for generating the drive signal; and wherein the driver is configured to synchronize the transitions of the timing signal to transitions of a switch signal for a switch of the switching bridge.

4. The power transmitter of claim 1, wherein the frequency modification circuit is configured to slow the state change for the capacitive impedance by diverting current from the inductive impedance away from the capacitive impedance during the fractional time intervals.

5. The power transmitter of claim 4, wherein the frequency modification circuit comprises a current diversion path configured to divert current from the inductive resonance away from the capacitive impedance, the current diversion path comprising a switch for connecting and disconnecting the current diversion path; and the frequency modification circuit being configured to align switching of the switch to the timing signal.

6. The power transmitter of claim 5, wherein the frequency modification circuit comprises a switch and a rectifier coupled in a series configuration and the frequency modification circuit is configured to align one of the start time and the end time to the transitions and to synchronize another of the start time and the end time to the rectifier switching between a non-conductive state and a conductive state.

7. The power transmitter of claim 4, wherein a first end of the current diversion path is coupled to a junction point between the inductive impedance and the capacitive impedance.

8. The power transmitter of claim 7, wherein a second end of the current diversion path is coupled to a voltage supply rail.

9. The power transmitter of claim 4, wherein the driver comprises a switching bridge generating the drive signal; and the driver is configured to synchronize the transitions of the timing signal to coincide with transitions of a switch signal for a switch of the switching bridge.

10. The power transmitter of claim 9 wherein, the current diversion path comprises a switch and a rectifier coupled in a series configuration, a first end of the current diversion path is coupled to a junction point between the inductive impedance and the capacitive impedance and a second end of the current diversion path is coupled to a ground supply rail for the switching bridge, and the power transmitter is configured to align start times of the fractional time interval to a time of the rectifier switching from a non-conductive to a conductive state and to align end times of the fractional time interval to a switching of a switch of the switching bridge.

11. The power transmitter of claim 1, wherein the frequency modification circuit is configured to slow the state change for the inductive impedance by impeding current flow from the capacitive impedance to the inductive impedance during the fractional time interval.

12. A power transmitter for wirelessly providing power to a power receiver via an inductive power signal, the power transmitter comprising:
a resonance circuit configured to generate the inductive power signal, the resonance circuit comprising a capacitive impedance and an inductive impedance;
a driver for generating a drive signal for the resonance circuit, the drive signal having an operating frequency and being configured to generate a timing signal to have transitions synchronized to the drive signal: and
a frequency modification circuit configured to control a resonance frequency of the resonance circuit by slowing a state change for at least one of the capacitive impedance and the inductive impedance for a fractional time interval of each of at least a plurality of cycles of the drive signal, the frequency modification circuit being configured to align at least one of a start time and an end time for the fractional time interval to at least some of the transitions of the timing signal,
wherein the frequency modification circuit comprises a switch and a rectifier and the frequency modification circuit is configured to align one of the start time and the end time to the transitions and to synchronize another of the start time and the end time to the rectifier switching between a non-conductive state and a conductive state.

13. A power transmitter for wirelessly providing power to a power receiver via an inductive power signal, the power transmitter comprising:
a resonance circuit configured to generate the inductive power signal, the resonance circuit comprising a capacitive impedance and an inductive impedance;
a driver for generating a drive signal for the resonance circuit, the drive signal having an operating frequency and being configured to generate a timing signal to have transitions synchronized to the drive signal: and
a frequency modification circuit configured to control a resonance frequency of the resonance circuit by slowing a state change for at least one of the capacitive impedance and the inductive impedance for a fractional time interval of each of at least a plurality of cycles of the drive signal, the frequency modification circuit being configured to align at least one of a start time and an end time for the fractional time interval to at least some of the transitions of the timing signal,
wherein the frequency modification circuit is configured to slow the state change by blocking current flow from the capacitive impedance to the inductive impedance during the fractional time interval.

14. A method of operation for a power transmitter for wirelessly providing power to a power receiver using an inductive power signal, the power transmitter comprising a resonance circuit for generating the inductive power signal, the resonance circuit comprising a capacitive impedance and an inductive impedance; the method comprising acts of:
a driver generating a drive signal for the resonance circuit, the drive signal having an operating frequency, and generating a timing signal to have transitions corresponding to a change in a signal parameter of the timing signal, the transitions being synchronized to the drive signal; and a frequency modification circuit controlling a resonance frequency for the resonance circuit by slowing a state change for at least one of the capacitive impedance and the inductive impedance for a fractional time interval of each of at least a plurality cycles of the drive signal, wherein the controlling act includes acts of:
   aligning one of a start time and an end time for the fractional time interval to at least some transitions of the timing signal, and
   controlling another of the start time and the end time to have a fixed time offset relative to a time instant of a signal of at least one of the capacitive impedance and the inductive impedance crossing a threshold.

15. A wireless power transfer system comprising a power receiver and a power transmitter configured to wirelessly provide power to the power receiver using an inductive power signal; the power transmitter comprising:
   a resonance circuit for generating the inductive power signal, the resonance circuit comprising a capacitive impedance and an inductive impedance;
   a driver for generating a drive signal for the resonance circuit, the drive signal having an operating frequency and being configured to generate a timing signal to have transitions synchronized to the drive signal; and
   a frequency modification circuit for controlling a resonance frequency of the resonance circuit by slowing a state change for at least one of the capacitive impedance and the inductive impedance for a fractional time interval of each of at least a plurality of cycles of the drive signal, the frequency modification circuit being configured to align one of a start time and an end time for the fractional time interval to at least some transitions of the timing signal and to control another of the start time and the end time to have a fixed time offset relative to a time instant of a signal of at least one of the capacitive impedance and the inductive impedance crossing a threshold.

* * * * *